(12) United States Patent
Davis et al.

(10) Patent No.: US 6,643,696 B2
(45) Date of Patent: Nov. 4, 2003

(54) METHOD AND APPARATUS FOR TRACKING CLIENT INTERACTION WITH A NETWORK RESOURCE AND CREATING CLIENT PROFILES AND RESOURCE DATABASE

(76) Inventors: Owen Davis, 214 W. 102nd St., New York, NY (US) 10025; Vidyut Jain, 352 6th Ave., Brooklyn, NY (US) 11215

(*) Notice: Subject to any disclaimer, the term of this patent is extended or adjusted under 35 U.S.C. 154(b) by 0 days.

(21) Appl. No.: 09/210,235

(22) Filed: Dec. 11, 1998

(65) Prior Publication Data

US 2002/0099812 A1 Jul. 25, 2002

Related U.S. Application Data

(63) Continuation-in-part of application No. 09/120,376, filed on Jul. 21, 1998, now Pat. No. 6,138,155, which is a continuation of application No. 08/821,534, filed on Mar. 21, 1997, now Pat. No. 5,796,952.

(51) Int. Cl.[7] ............................................... G06F 13/00
(52) U.S. Cl. ....................................................... 709/224
(58) Field of Search ............................. 705/7, 30, 10; 707/526, 104; 709/200, 202, 203, 213, 217, 218, 219, 223, 224

(56) References Cited

U.S. PATENT DOCUMENTS

| | | | | |
|---|---|---|---|---|
| 4,977,594 A | * | 12/1990 | Shear | ............................ 705/53 |
| 5,638,443 A | * | 6/1997 | Stefik et al. | .................... 705/54 |
| 5,675,510 A | * | 10/1997 | Coffey et al. | ................ 709/224 |
| 5,682,525 A | * | 10/1997 | Bouve et al. | ................. 705/54 |
| 5,706,502 A | * | 1/1998 | Foley et al. | ................... 707/10 |
| 5,708,780 A | * | 1/1998 | Levergood et al. | .......... 709/229 |
| 5,710,918 A | * | 1/1998 | Lagarde et al. | ................ 707/10 |
| 5,715,453 A | * | 2/1998 | Stewart | ...................... 707/104 |
| 6,108,637 A | * | 8/2000 | Blumenau | ....................... 705/7 |

* cited by examiner

Primary Examiner—Robert B. Harrell
(74) Attorney, Agent, or Firm—Brown, Raysman, Millstein, Felder & Steiner LLP

(57) ABSTRACT

A method for monitoring client interaction with a resource downloaded from a server in a computer network includes the steps of using a client to specify an address of a resource located on a first server, downloading a file corresponding to the resource from the first server in response to specification of the address, using the client to specify an address of a first executable program located on a second server, the address of the first executable program being embedded in the file downloaded from the first server, the first executable program including a software timer for monitoring the amount of time the client spends interacting with and displaying the file downloaded from the first server, downloading the first executable program from the second server to run on the client so as to determine the amount of time the client interacts with the file downloaded from the first server, using a server to acquire client identifying indicia from the client, and uploading the amount of time determined by the first executable program to a third server.

59 Claims, 11 Drawing Sheets

METHOD AND APPARATUS FOR TRACKING CLIENT INTERACTION WITH A NETWORK RESOURCE AND CREATING CLIENT PROFILES AND RESOURCE DATABASE

RELATED APPLICATIONS

This application is a continuation-in-part of application Ser. No. 09/120,376, titled "METHOD AND APPARATUS FOR TRACKING CLIENT INTERACTION WITH A NETWORK RESOURCE AND CREATING CLIENT PROFILES AND RESOURCE DATABASE", filed Jul. 21, 1998, now U.S. Pat No. 6,138,155, which is a continuation of application Ser. No. 08/821,534, titled "METHOD AND APPARATUS FOR TRACKING CLIENT INTERACTION WITH A NETWORK RESOURCE AND CREATING CLIENT PROFILES AND RESOURCE DATABASE", filed Mar. 21, 1997, issued Aug. 18, 1998, as U.S. Pat. No. 5,796,952, the disclosures of which are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to a method and apparatus for monitoring client use of and interaction with a resource downloaded from a server on a computer network, for storing monitored data, for creating a database including profiles indexed by user and/or resource identity, and for generating customized resources based upon client profiles.

BACKGROUND OF THE INVENTION

The development of software packages designed to permit simplified graphical user interface (GUI)-based access to the wealth of electronic information available over the Internet and the World Wide Web has lead to a dramatic increase in the amount of information that is currently available over public computer networks. Unlike the highly controlled atmosphere of a private computer network, however, it is difficult to monitor user interaction with network resources on public networks. As a result, it is difficult for individual servers on a public network to determine how long individual users have interacted with their resources, or how much information has been downloaded. It is equally difficult for individual servers to target specialized information to a particular audience or to learn the identity of individual users on a public network.

The techniques utilized in many private networks for monitoring client use and interaction do not lend themselves to public networks. For example, user access to a server in private networks is generally obtained through the use of a unique identification number provided by the server. Details of individual user interaction with the network are closely monitored by server-resident processes, and historic databases are automatically generated and continually updated to track the nature and amount of information accessed by individual users, as well as their connection time. This information is generally used, for example, to maintain a subscriber-indexed billing database.

In a public computer network, however, use of server-resident monitoring techniques may be severely limited. In some public networks, subscribers are given unlimited access, via a service provider, to a virtually unlimited number of servers, and no permanent connection is usually made between these servers and a client machine. The nature and amount of information downloaded by individual users is not easily monitored for each client machine and only limited information concerning individual user interaction with the network may generally be captured by a server (i.e., so-called network ID and client ID).

Due largely to the lack of advanced monitoring techniques available to individual servers on a public network, the same information is generally served out to all clients on a completely untargeted basis. In other words, the same information is generally downloaded to all users that access a particular resource on a server, irrespective of individual user interests. There is therefore a need to provide servers on a public network with the ability to automatically monitor use of and interaction with resources downloaded by users so as to facilitate the targeted serving of information.

While various methods are known for obtaining information concerning user preferences, no such methods are automatic. For instance, one application, known as a "customizable home page", permits users, upon the request of a server, to make certain choices. When a user who has done so contacts that server at a later date, the server assembles information for downloading to the user in accordance with the previously-selected choices. More specifically, the user visits a so-called "Web page" of a particular server where he or she is asked to fill in a blank form by selecting various preferences, such as links to favorite Web sites, interests in entertainment, sports, and the like. The user then submits this information to the server by clicking the so-called "submit" button of the fill-in form, which causes the client to transmit the information to the server. The server returns a Web page with a response header which creates, or "sets" an ID field located in a file on the client computer (this file is known as the "client ID" or "cookie") to include information about the user's preferences. When the user later returns to a specified Uniform Resource Locator, or "URL", on the same server, the "client ID" or "cookie" with the previously-set preference information is transmitted in the HTTP request header to the server, which can then return a Web page that is assembled according to the user-specific information. This application is disclosed, for example, in A. Gundavaram, CGI Programming on the World Wide Web, O'Reilly Press, 1996.

While the "customizable home page" facilitates the serving of information on a limited targeted basis, it does not provide for the automatic determination of user interests, and inconveniences the user by requesting that he or she specify various preferences. Moreover, use of a customizable home page is limited to individual Web sites and can not be "spread out" over multiple resources on different servers. In other words, while a customizable home page may be of use with respect to the particular resources located on a single server, it does not serve any purpose for other servers on a public network. A variation of this technique is used by some servers to download executable programs. For instance, one such application disclosed by G. Cornell and C. S. Horstmann, in Core Java, The SunSoft Press, 1996, involves the generation of "order forms" on client computers. In this application, the client machine loads a Web page from a server which has an embedded link to an executable program that downloads to and executes on the client machine. Upon execution in the client machine, the program contacts the server and retrieves a list of goods and associated prices. The program allows the user to order various goods and requires the user to fill out a form for billing purposes. The user "clicks" on the submit button of the fill-in form to transmit the information to the server. Like the customizable home page, this method of user-specific data acquisition requires the active participation of the user, and does not provide for the automatic determination of user preferences and interests.

In addition to the inability to serve out information on a targeted basis, which is of enormous concern from a marketing standpoint, the limited monitoring capabilities available to individual servers makes it difficult for servers and administrators to determine how long users have viewed their resources and how much information has been downloaded by individual users so as to be able to bill client use and interaction with network resources and to analyze the value and effectiveness of such resources. As a result, much of the information provided by a server over a public network is the same for all clients. In addition, while it is currently possible to track a user's links within the same resource, there is no standard way to track user's links across multiple resources on different servers. For example, a common occurrence in public networks is when a user is viewing a first resource and "clicks on" a link to a second resource located on a different server. In such instances, the second resource is downloaded and the first resource is either discarded or held in background. However, there is generally no uniform way in which to monitor such occurrences. In addition, while it is currently possible to track the number of times a particular resource has been accessed, it has generally not been possible to track the length of time a particular resource has been viewed by a particular user. There is also a great deal of other valuable information concerning user interaction with a resource which would be useful to administrators, advertisers, marketing professionals and the like, but which can not be conveniently collected using current monitoring techniques.

For example, one of the largest public networks, the "Internet", has become an extremely popular advertising tool. Many companies have their own Internet "Web sites" and have also purchased advertising space within more popular Web sites of other companies. For instance, many advertisers purchase so-called "advertising banner" (or "ad banner") space within the Web page of a popular site, thereby allowing consumers to "click-through" (i.e., specify a link) to the Web site of the advertiser. In many cases, the use of an ad banner substantially increases the advertiser's exposure. Using the limited monitoring techniques available to Internet servers, however, it is difficult to determine the effectiveness of individual Web sites and ad banners. For instance, known monitoring techniques are generally limited to determining the number of times a Web page was downloaded. Similar techniques are used to determine the number of times an ad banner (which is embedded inside a Web page) has been displayed, and how many times the banner was "clicked" on to visit the Web site of the advertiser.

Generally, an ad banner is embedded inside a Web page located on a first server through the use of the known HTML<IMG> tag. When a client machine passes a TCP/IP request for the Web page to the first server, the Web page is downloaded to the client, including the ad banner embedded using the <IMG> tag. The <IMG> tag is used to reference a resource (i.e., the "ad banner") stored on the same or a different server which captures the user's ID (via the HTTP request header) and dynamically returns an ad related image to the client for display within the Web page. At the same time, a counter representing the number of times the specific ad has been displayed is incremented. The ad banner itself may have an embedded address referring to yet another Web resource. In such an instance, if the user "clicks" on the ad banner, the client may load a resource on the second server which once again captures the user's ID and forwards the user to a Web resource which is appropriate for the displayed ad (for example, a page on the advertiser's Web site). At the same time, a counter representing the number of times the specific ad was clicked on to go to the advertiser's Web site is incremented.

While Web sites and ad banners have, in some cases, been valuable marketing tools, the limited monitoring capabilities available to servers on networks in which no permanent connection is made between a server and a client (such as the Internet) has prevented these marketing tools from being used to their fill potential. Since HTTP or Web servers cannot automatically determine the amount of time and the frequency at which particular users interact with their resources, Web site administrators and advertisers cannot accurately determine the effectiveness of their resources. Since servers cannot automatically monitor user interaction and automatically obtain user preferences and interests, servers cannot assemble and serve resources targeted to individual user interests.

BRIEF SUMMARY OF THE INVENTION

In view of the foregoing shortcomings of the prior art, an object of the present invention is to provide a method for tracking the use and interaction of a user with a resource downloaded from a server on a network by use of a tracking program embedded in the resource and executable by a client. Another object of the present invention is to transmit the tracking information from a client to another computer connected to the network for storage and analysis.

Still another object of the present invention is to create a database of server resources including, but not limited to, the number of times a resource has been displayed by clients, the amount of time displayed, and the type and amount of information that was displayed or transferred. This information could be used by network administrators or servers to analyze the effectiveness of the resources made available on their network servers.

Yet another object of the present invention is to provide means for creating a database of user profiles for use by advertisers and/or marketers to determine the effectiveness and value of network-based advertisements and/or marketing resources.

Still yet another object of the present invention is to provide means for creating a database of user profiles containing details of individual user interaction with and use of network resources including, for example, Network IDs (known as "IP address") and client IDs (known as "cookies") that have accessed particular resources, the amount of time spent by users interacting with and/or using particular resources, and details of choices created by individual users within a particular resource.

It is still yet another object of the present invention to provide means for assembling a resource, such as a Web page or a highly targeted ad banner, in accordance with a historic user profile.

In order to achieve the above-described and other objects and advantages, a tracking program is embedded in a file which is downloaded from a server to a client. The tracking program need not originate from the same server that sent the file, and may be obtained, for example, via an embedded URL that points to a different server. The tracking program may be part of a larger program that performs other operations (such as displaying animations, playing sounds, etc.). The tracking program is downloaded from a server and runs on the client to monitor various indicia, such as elapsed time, mouse events, keyboard events, and the like, in order to track the user's interaction with and use of the file or to monitor choices (such as selections or links to other resources or files) made by the user while within the file. The tracking program may also monitor the amount of data downloaded by the client. Operation of the tracking program commences after the program is downloaded and any required initialization occurs.

After monitoring the user's interaction with and use of the file downloaded from the server, the tracking program then automatically sends the information acquired from the client back to a server for storage and analysis. The information may be sent before or as the client exits the file, or may be sent in response to a predetermined user action. The information preferably includes any available client or network IDs.

The acquired information is preferably stored on a server and used to build historical profiles of individual users, to serve out highly targeted information based upon user profiles, as well as to extract information about how much data was downloaded by a respective client, and how long or how often specific files were displayed or in use by the client.

Preferably, the tracking program is implemented in a network based upon the client/server model, and may be implemented in a public network such as the Internet or World Wide Web. The tracking program may monitor use of and interaction with any of the resources downloaded from a server, including an executable program, a database file, an interactive game, a multimedia application, and the like. In the case of the Internet, for example, the tracked resource may, for example, be a file such as a Web page or part of a Web page (such as an ad banner).

In one embodiment of the present invention, the tracking program is embedded in an HTML document (such as a Web site, a Web page, or part of a Web page—e.g. an "ad banner"). A TCP/IP connection is used by a client to pass a request for the HTML document. The HTML document is stored in a server running an HTTP service and contains text and one or more first embedded URLs for pointing to one or more graphical images located on a server, the images being embedded inside the HTML document using an HTML<IMG> tag to specify the source URL for an image. The HTML document also contains a second embedded URL for pointing to a first executable program that runs on a server, the first executable program being embedded inside the HTML document using an HTML<IMG> tag to specify the source URL for the program. A second executable program is also embedded in the HTML document by using a third URL for pointing to the second executable program. Unlike the first executable program, the second executable program is downloaded and runs on the client. The second executable program is embedded using the proper HTML tag to indicate that it is a program that is executable on the client.

After the HTML document is downloaded to the client, the graphical images are fetched using a TCP/IP connection to server resources specified by the one or more first URLs. In attempting to fetch the resource associated with the first executable program, the client causes the program to run on the server specified by the second URL. Upon execution of the first executable program, the server captures identifying indicia from the client, such as any network or client IDs resident in the HTTP request header sent by the client. The server stores this information in a client profile database.

The client also fetches the second executable program, which is the tracking program. The tracking program downloads to the client, and, after performing any required initialization, determines the current time. The tracking program also determines the current time upon the performance of a predetermined operation on the client computer by a user, such as leaving the HTML document. After calculating the amount of time the user interacted with and displayed the HTML document, i.e., by determining the difference in time values, the tracking program uploads the calculated value to the server for storage in the user profile database.

DETAILED DESCRIPTION OF THE PREFERRED EMBODIMENTS

The teachings of the present invention are applicable to many different types of computer networks and may also be used, for instance, in conjunction with direct on-line connections to databases. As will be appreciated by those of ordinary skill in the art, while the following discussion sets forth various preferred implementations of the method and system of the present invention, these implementations are not intended to be restrictive of the appended claims, nor are they intended to imply that the claimed invention has limited applicability to one type of computer network. In this regard, the teachings of the present invention are equally applicable for use in local area networks of all types, wide area networks, private networks, on-line subscription services, on-line database services, private networks, and public networks including the Internet and the World Wide Web. While the principles underlying the Internet and the World Wide Web are described in some detail hereinbelow in connection with various aspects of the present invention, this discussion is provided for descriptive purposes only and is not intended to imply any limiting aspects to the broadly claimed methods and systems of the present invention.

The present invention, although equally applicable to public and private computer networks, is particularly useful for performing monitoring functions in connection with public networks which could not heretofore be performed. For this reason, implementation of the present invention will be discussed in detail in connection with the Internet and the World Wide Web. This discussion is equally applicable to any network based upon the client/server model.

Accordingly, as will be appreciated by those of ordinary skill in the art, as used herein, the term "client" refers to a client computer (or machine) on a network, or to a process, such as a Web browser, which runs on a client computer in order to facilitate network connectivity and communications. Thus, for example, a "client machine" can store and one or more "client processes." The term "user" is used to broadly refer to one or more persons that use a particular client machine.

Figure 1:
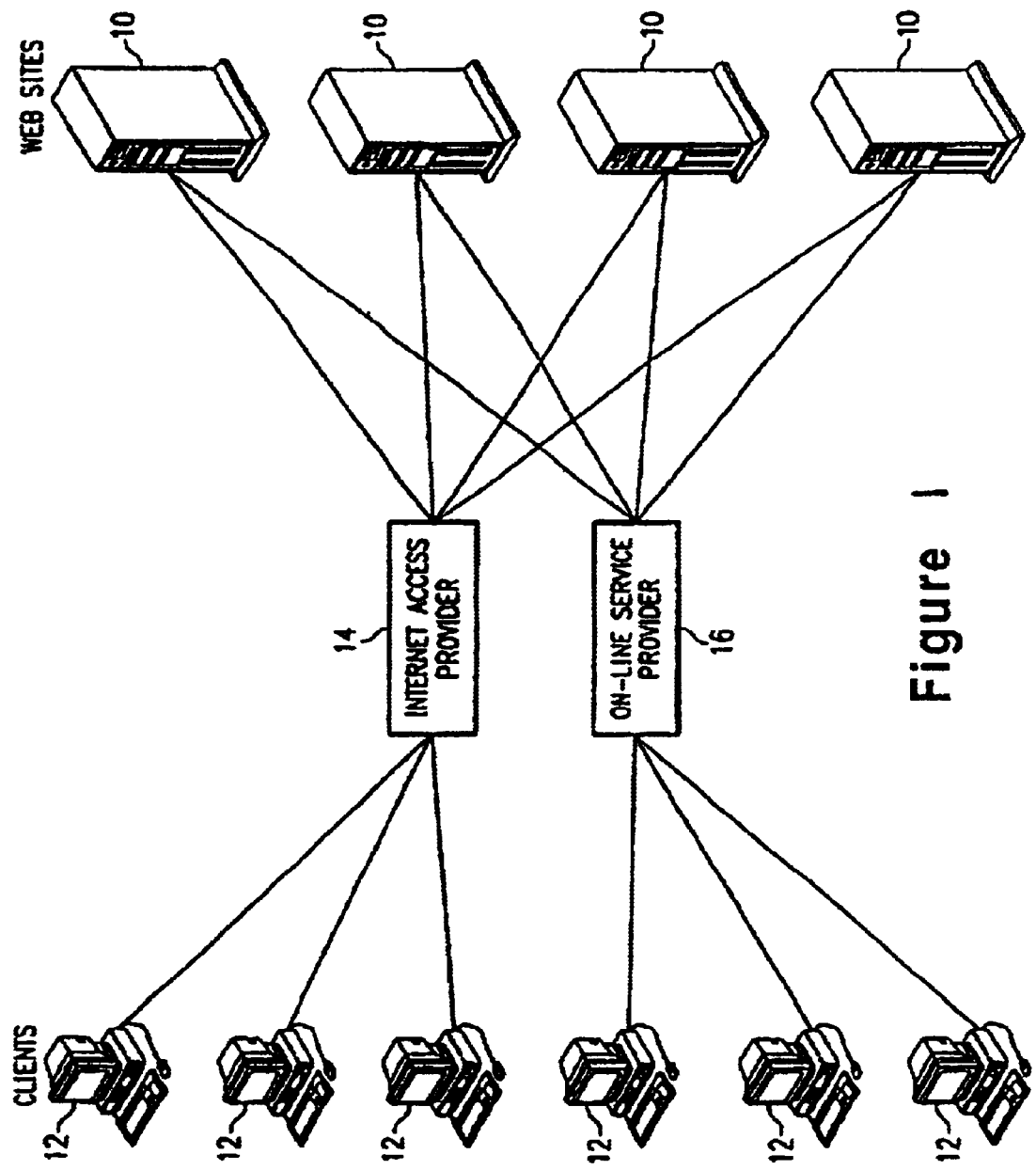
FIG. 1 is a diagram of a computer network in which the present invention may be implemented.

FIG. 1 illustrates a known computer network based on the client-server model, such as the Internet. The network comprises one or more "servers" 10 which are accessible by "clients" 12, such as personal computers, which, in the case of the Internet, is provided through a private access provider 14 (such as Digital Telemedia in New York City) or an on-line service provider 16 (such as America On-Line, Prodigy, CompuServe, the Microsoft Network, and the like). Each of the clients 12 may run a "Web browser", which is a known software tool used to access the Web via a connection obtained through an Internet access provider. The servers allow access to various network resources. In the Internet, for example, a Web server 10 allows access to so-called "Web sites" which comprise resources in various different formats. A location of a resource on a server is identified by a so-called Uniform Resource Locator, or URL.

The "World Wide Web" ("Web") is that collection of servers on the Internet that utilize the Hypertext Transfer Protocol (HTTP). HTTP is a known application protocol that provides users access to resources (which can be information in different formats such as text, graphics, images, sound, video, Hypertext Markup Language-"HTML" etc., as well as programs). HTML is a standard page description language which provides basic document formatting and allows the developer to specify "links" to other servers and files. Links are specified via a Uniform Resource Locator or "URL". Upon specification of a link, the client makes a TCP/IP request to the server and receives information that was specified in that URL (for example another "Web page" that was formatted according to HTML) in return. The information returned may be generated in whole or in part by a program that executes on the server. Such programs are typically known as CGI (Common-Gateway-Interface) scripts and can be written using known programming languages or methods that the server supports, such as PERL or C++. A typical Web page is an HTML document with text, "links" that a user may activate (e.g. "click on"), as well as embedded URLs pointing to resources (such as images, video or sound) that the client must fetch to fully render the Web Page in a browser. These resources may not be located on the same server that the HTML document was sent from. Furthermore, HTTP allows for the transmission of certain information from the client to a server. This information can be embedded within the URL, can be contained in the HTTP header fields, or can be posted directly to the server using known HTTP methods.

Figure 2:
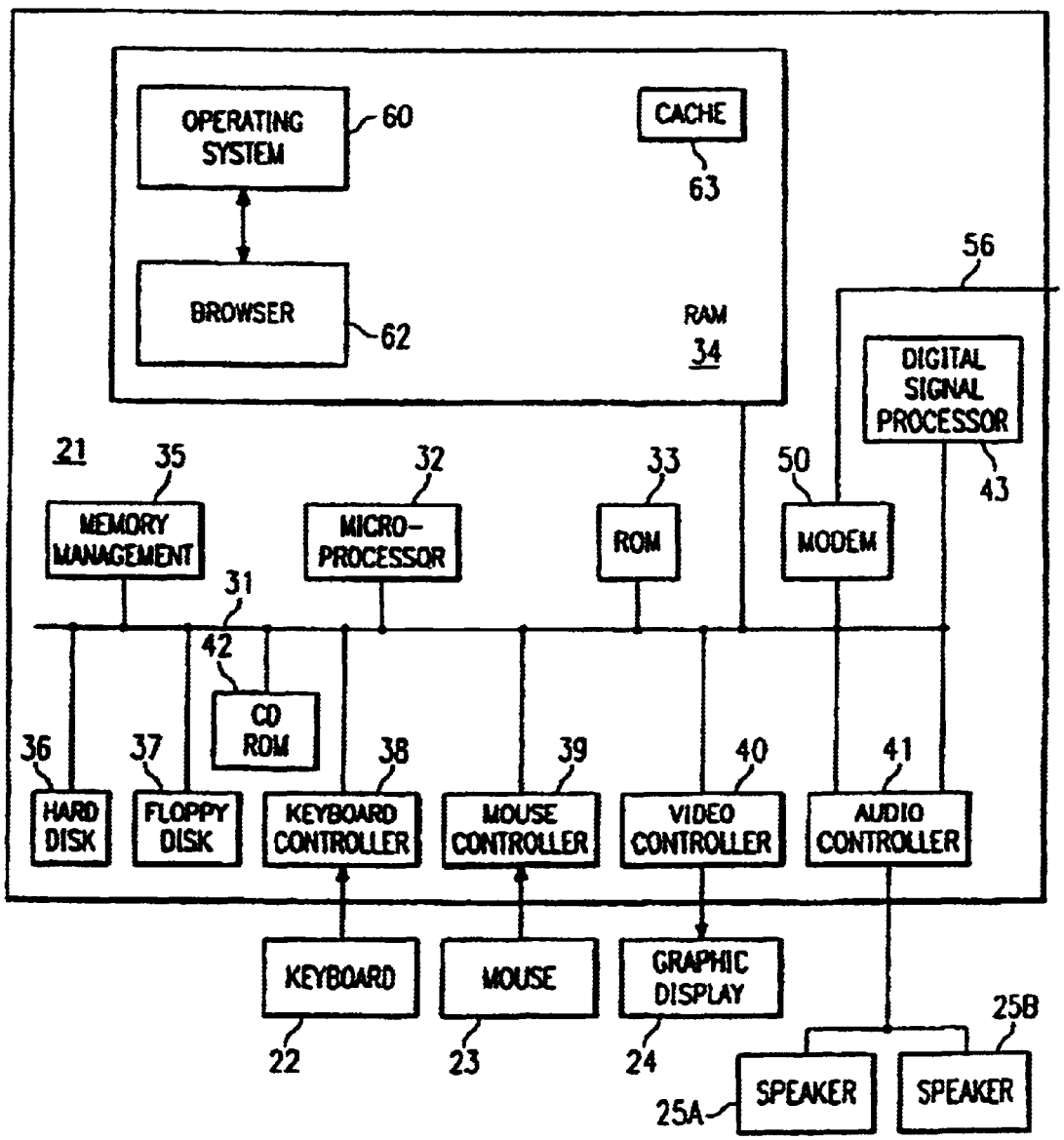
FIG. 2 is a block diagram of a client computer which is used in connection with various preferred embodiments of the present invention.

FIG. 2 is a block diagram of a representative "client" computer. The same or similar computer can also be used for each of the servers. The system unit 21 includes a system bus 31 to which various components are coupled and by which communication between the various components is accomplished. The microprocessor 32 is connected to the system bus 31 and is supported by a read only memory (ROM) 33 and random access memory (RAM) 34. The ROM 33 contains, among other code, the basic input-output system (BIOS) which controls basic hardware operations such as the interaction and the disk drives and the keyboard. The RAM 34 is the main memory into which the operating system 60 and application programs, such as a Web browser 62, are loaded and cached 63. The memory management chip 35 is connected to the system bus 31 and controls direct memory access operations, including passing data between the RAM 34 and the hard disk drive 36 and the floppy disk drive 37. The CD ROM 42, also coupled to the system bus, 31, is used to store a large amount of data, e.g., multimedia programs or large databases.

Also connected to the system bus 31 are various I/O controllers: the keyboard controller 38, the mouse controller 39, the video controller 40, and the audio controller 41. The keyboard controller 38 provides the hardware interface for the keyboard 22, the controller 39 provides the hardware interface for the mouse (or other hand-operated input implement) 23, the video controller 40 provides the hardware interface for the display 24, and the audio controller 41 is the hardware interface for the multimedia speakers 25a and 25b. A modem 50 (or network card) enables communication over a network 56 to other computers over the computer network. The operating system 60 of the computer may be Macintosh OS, OS/2, AIX, BE OS or any other known operating system, and each client computer is sometimes referred to as a "client machine", a client "computer", or simply as a "client."

As noted above, the Internet includes a public network using the Internet Protocol (TCP/IP) and includes servers 10 which are accessible by clients 12. When a Web browser 62 is used to access a file on a server 10, the server 10 may send information including graphics, instruction sets, sound and video files in addition to HTML documents (Web pages) to the requesting client.

In accordance with the present invention, a tracking program is embedded in a resource, such as an HTML document which is sent from a server to a client based on a TCP/IP request. The tracking program may originate on a different server than the resource, in which case it may be obtained by the client through a TCP/IP request to the other server. The tracking program executes on a client machine, and is stored, for example, in RAM. The tracking program may monitor various indicia, such as time, mouse events, keyboard events, and the like, in order to track a user's interaction with the Web page. Thus, the tracking program may simply monitor the amount of time the user spends interacting with the Web page, or may monitor details of choices (such as links) made by individual users within a particular Web page.

In some cases, clients will "cache" a resource obtained over the network (or temporarily store a copy of the resource on the user's computer), and may use the cached copy of the resource instead of obtaining it over the Internet when the resource is needed at a later time (for example, in order to completely render a Web page). In such cases, neither the basic operations nor functions of the tracking program nor the transmission of tracked information to a server, differ from the cases where cached copies were not used.

In one embodiment of the present invention, a tracking program is embedded in an HTML of a Web page and downloaded by a client. The tracking program may monitor operation of a peripheral input device connected to the client machine, such as a keyboard or mouse, keep a record of which choices, if any, are made by a user, and may monitor the length of time the user has displayed the Web page in addition to the time spent interacting with a particular part of it. While in the preferred embodiment, the tracking program is embedded in an HTML document, those skilled in the art will recognize that other mechanisms are possible for embedding the tracking program in the client hardware, and the patent is not limited to implementation as an executable program embedded in an HTML document. For example, the tracking program may be downloaded and installed in a client process, as would be the case for a so-called "plug-in" or "helper" application. Alternatively, the tracking program can be built into a client application or client process such that it need not be separately downloaded and installed. In addition, the teachings of the present invention are not limited to use on the Internet or the World Wide Web. For instance, the tracking program of the present invention may be utilized on a so-called "Intranet".

As noted above, a client process, such as a Web browser running on the client machine, uses a TCP/IP connection to pass a request to a Web server running an HTTP service (or "daemon" under the UNIX operating system). The HTTP service then responds to the request, typically by sending a Web page formatted in the Hypertext Markup Language, or HTML, to the browser. The browser displays the Web page using local resources (e.g., fonts and colors). Unless the tracking program is already resident in the client, it is embedded in the Web page and downloaded to the client along with the Web page. The tracking program is executed after any required initialization has occurred. The tracking program may monitor the length of time the user remains in the Web page, or any one or more portions thereof, and may track some or all mouse and keyboard events to provide meaningful data to the server concerning the user's interaction with the Web page.

In its simplest form, the tracking program is a timer program linked to an HTML document and is downloaded and executed on a client when the HTML document is served to the client in response to a client TCP/IP request. During or after the client formats and displays the Web page specified by the HTML document, the tracking program begins a software timer to monitor the amount of time the Web page is displayed on the client computer.

When the user leaves the Web page (for example, by exiting the Web page or "clicking" on a link to another resource on the same or another server), the tracking program sends the monitored time to another computer on the Internet for storage and analysis.

Figure 3:
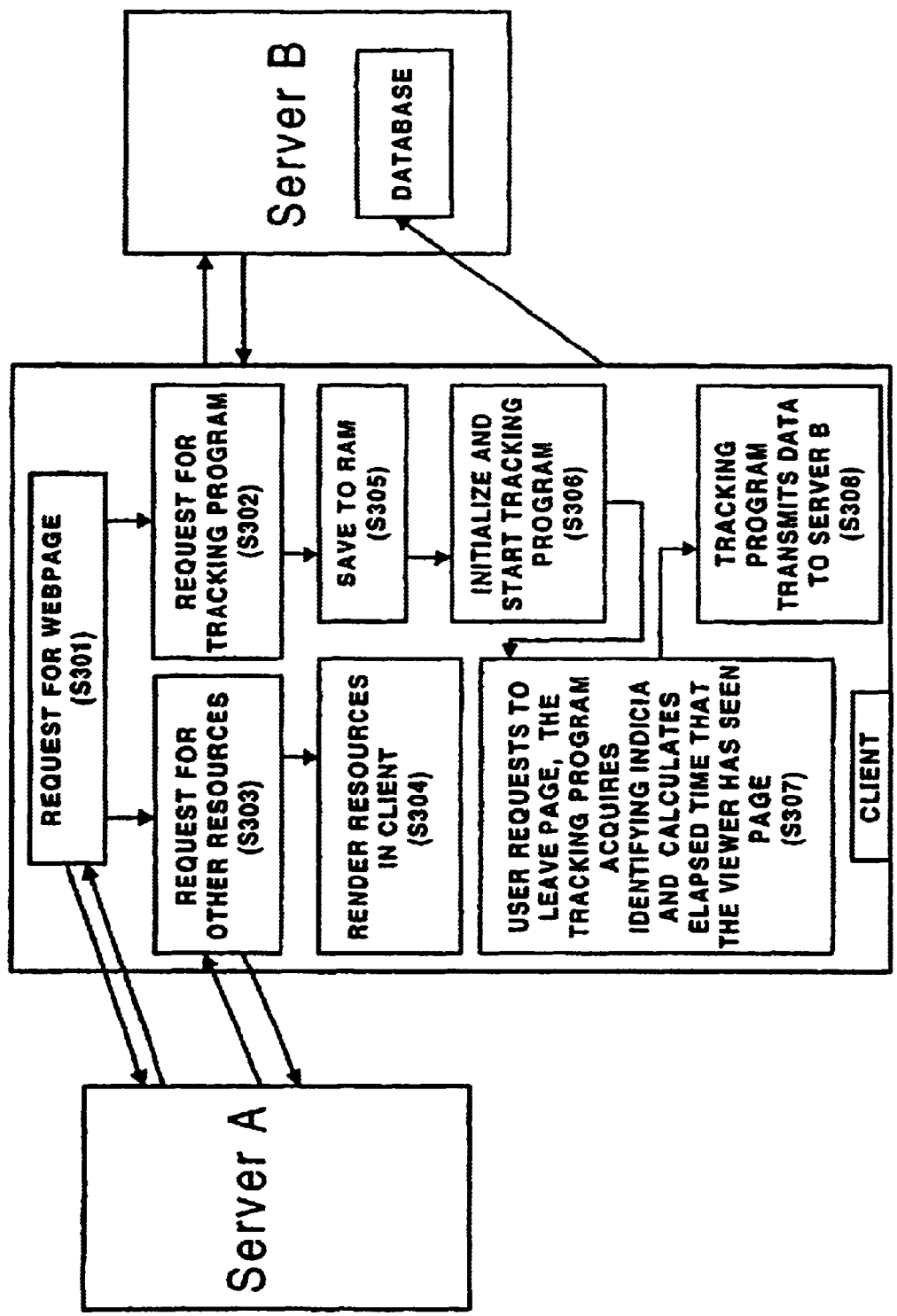
FIG. 3 is a flowchart diagram of a first embodiment of the present invention, which is a method for monitoring the amount of time a Web page is displayed on a client computer.

As illustrated, for example, in FIG. 3, the client issues a TCP/IP request for a Web page located on a Server A (S301). After a handshaking period, the Server A begins to send the HTML formatted document, which contains an embedded URL referencing the tracking program. The client additionally issues a TCP/IP request to the Server B referenced by the embedded URL in order to obtain the tracking program (S302). The client also makes any other TCP/IP requests (S303) to obtain any other resources (such as images, video or sound) needed in order to fully render the Web Page (S304). Each of such resources are typically referenced by individual URLs embedded in the HTML document. These requests need not occur in any specific order and may reference resources located on any server. In addition, the information requested may be received in any order. When the tracking program has been obtained, the client process (i.e., the Web browser) saves the tracking program to RAM (S305). After any necessary initialization, the tracking program initiates a software timer to monitor the amount of time the Web page is displayed (S306). When the client leaves the Web page (S307), the tracking program calculates the amount of time the user has interacted with and displayed the Web page and sends this information to a server. Other available client information, such as the network ID and client ID, or so-called "Cookie" of the client, is also sent to the server (S308). If desired, other information concerning the client computer may be automatically acquired and sent to the server, such as the type of hardware in the client computer and various resources that are resident on the client computer.

Due to the technical limitations imposed by the Internet, the JAVA programming language was applied to the Internet in 1995 by programmers at Sun Microsystems, Inc. of Mountain View, Calif. For example, some of the fundamental technology issues facing network programmers and engineers are portability, bandwidth and security. Portability allows the same executable code to run across multiple operating systems. Bandwidth specifies the amount of information that can transfer across the network at any time. For instance, high-speed lines categorized as T1 through T3 can transmit data at 1.544 through 45 megabits per second, ISDN lines can transmit data at rates of 64 through 128 kilobits per second, and standard phone lines, over which most users transmit data, currently transmit using modems at approximately 28.8 kilobits per second. In the case of a 640×480 pixel window on a computer display that is capable of displaying images in 256 colors (which requires one byte per pixel), in order to display the window's contents requires 307,200 bytes of data. To create an animation, programs typically display 15 to 30 different images per second. Given a 640×480 window, 15 to 30 frames per second would require 4,608,000 to 9,216,000 bytes per second. Because many users are currently browsing the Web using 28.8 kilobit (or slower) modems, there is simply not enough bandwidth to download animation screens. As a result, many Web sites today resemble magazines whose images are for the most part static (unchanging). However, to satisfy an audience that spends many hours in front of dynamic television images, Internet programmers and engineers must provide a way to animate Web sites. One solution is to download programs written in the JAVA programming language that implement the animation.

Animation is only one example of the use of JAVA. Using JAVA, programmers can create stand alone programs similar to those that programmers can develop using C++, and can also create so-called "applets" that run within a Web browser. To address security issues, JAVA developers ensured that a programmer could not develop a computer virus using a JAVA applet and that an applet could not arbitrarily transfer information concerning a user's system (such as a file on the user's system) back to the server. Thus, JAVA applets have limited operations. For example, a JAVA applet generally cannot currently read or write files on the user's system. In this way, an applet cannot store a virus on a user's disk or arbitrarily read information stored on a user's disk. In addition, for other security and stability reasons, JAVA developers eliminated or changed many features of the C and C++ programming languages, such as pointers, with which advanced programmers could bypass JAVA's security mechanisms.

JAVA applets run within a "JAVA-enabled client", such as Netscape Navigator version 2.0 (Windows 95 or Windows NT versions only) or later, or Microsoft's Internet Explorer version 3.0, or later. In addition, since most users browse with personal computers running Windows, Macintosh, UNIX-based systems, and the like, the JAVA developers designed JAVA to be portable, or "platform-independent". Thus, the same JAVA applets can be downloaded and run in any JAVA-enabled client process, irrespective of the platform type.

JAVA applets can be used by developers to create sophisticated, fully interactive multimedia Web pages and Web sites executable on any JAVA-enabled client. Representative JAVA applets are disclosed, for example, by O. Davis, T. McGinn, and A. Bhatani, in Instant Java Applets, Ziff-Davis Press, 1996.

Since JAVA provides the ability to download complex programming instructions in the form of applets that are executable by a JAVA-enabled Web browser, the tracking program of the present invention may be implemented in the JAVA programming language. As will be readily appreciated by those of ordinary skill in the art, however, the teachings of the present invention are not limited to JAVA applets or to the JAVA programming language whatsoever. In connection with the Internet, for example, the present invention may also be implemented in a so-called "Active-X" environment, in which the tracking program is written as an Active-X component.

As will be further appreciated by those of ordinary skill in the art, security restrictions may, in some cases, prevent one from having direct access to information stored on a client's hard disk, such as client IDs. In such cases, other means may be used to obtain this information. For example, when a Web browser makes a request for information from a server it typically includes certain information about the client in the "HTTP request header." The server receiving the request can obtain and store this information using known means implemented, for example, in a so-called "CGI script" executable on the server. Therefore, one way of obtaining client identifying indicia is to embed a request in the HTML file for another resource on a server that will obtain and store the indicia. This resource may be a program (such as a CGI script) that captures relevant information and stores it. This information can then be combined with information monitored by the tracking program to provide a more detailed knowledge base. This embedded request may be in addition to the embedded tracking program. Representative CGI scripts capable of capturing client identifying indicia are disclosed by A. Gundavaram, in CGI Programming on the World Wide Web, O'Reilly Press, 1996.

In order to store client-identifying indicia, such as a user's network ID (IP) and client ID numbers (cookies) and associated tracking information, a database is set up on a server. This may be done in any known manner, such as by using a commercially-available database program designed, for example, for the high-speed processing of large databases. In the case of the tracking program described above, the information stored in the server database may include the network ID, client ID, the associated link (the URL of the Web page), the amount of time the user spent interacting with the Web page, and any selections or choices made by the user while interacting with the Web page. Thus, the above-described tracking program permits Web site administrators and Internet advertisers, for example, to determine not only the number of user visits or hits made to a particular Web page, but also permits the accurate determination of the length of time users have displayed and/or interacted with their Web page. This is invaluable information to Internet advertisers, among others, and permits advertisers to make informed decisions as to the effectiveness and value of particular Web pages and/or ad banners.

Figure 4:
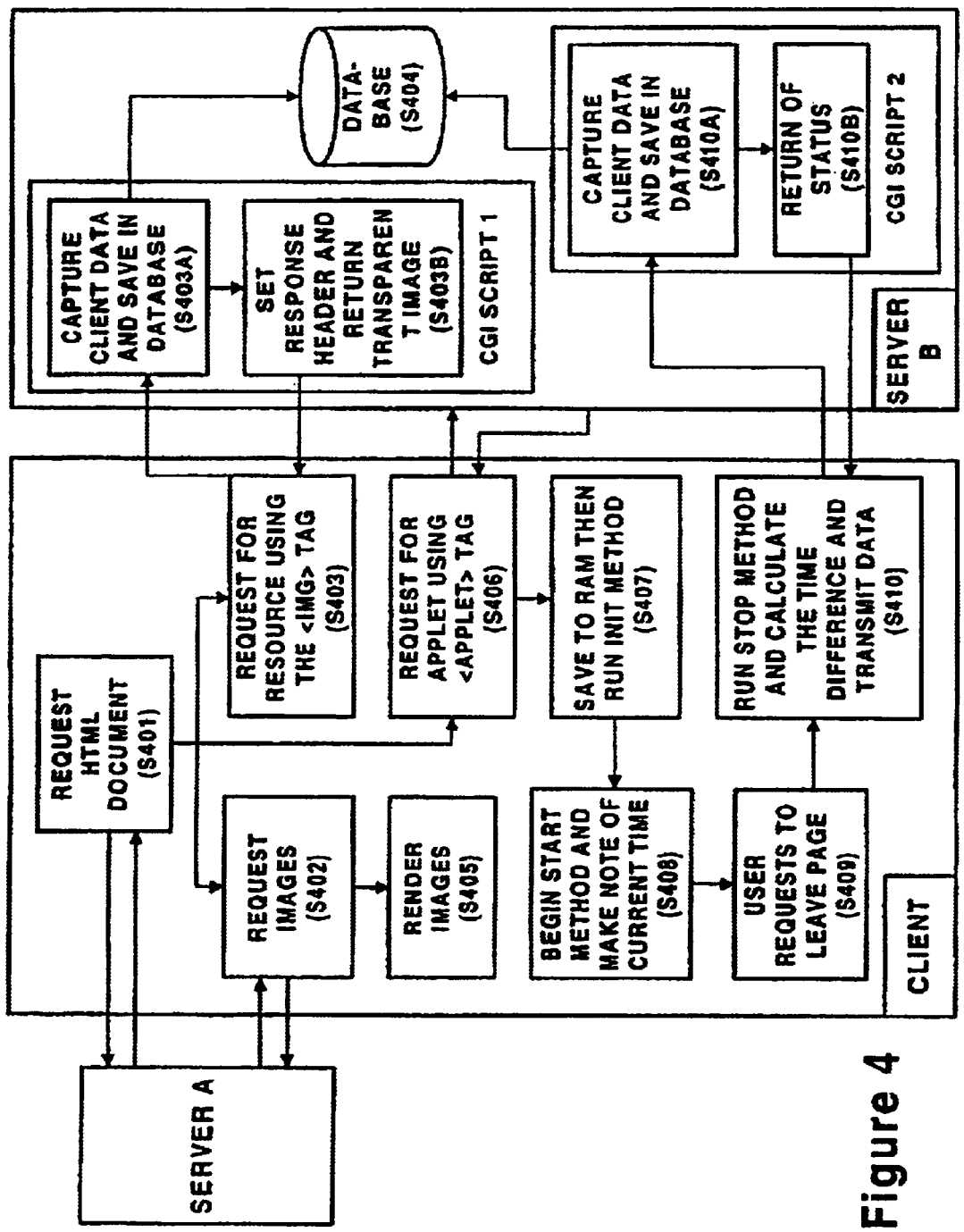
FIG. 4 is a flowchart diagram of a second embodiment of the present invention, which is a method for monitoring the amount of time a Web page is displayed on a client computer.

A more particular embodiment of this aspect of the invention is illustrated in FIG. 4. A Web page (or HTML document) is requested by the client from a first server A, using TCP/IP and HTTP protocols (S401). This HTML document contains text, as well as embedded URLs that point to graphical images (e.g. GIF format image files) also located on the first server A. The images, in general, may be located on any HTTP server on the Internet. These images are embedded inside the Web page using the known HTML<IMG> tag, which allows one to specify the source URL for an image, as well as additional information such as size and other layout parameters. These images will then be fetched by the client using TCP/IP and HTTP protocols from Server A (S402) and rendered on the browser (S405). The Web page (or other Web or HTML document) additionally includes embedded URLs which point to two resources that reside on a second server "B". One of the resources is an executable program, which executes on Server B, and is a CGI script. This resource is also embedded inside the Web page using the <IMG> tag. Thus, in attempting to render the Web page, the client will automatically fetch this resource (S403), which forces execution of the CGI script on the second Server B and the return of information output from the script to the client. In this case, the information returned to the client is formatted as an GIF image type which is extremely small as well as completely transparent (S403B). When the CGI script executes, it may collect information from the HTTP request header such as browser type, network ID (IP address), and if set, client ID ("cookie"), as well as any additional available information such as time of execution and the URL of the Web page, and store it in a database—for example using SQL (S403A, S404). In step S403B, the CGI script returns information to the client, which includes a response header which indicates (among other information), that the return type is an image, that this resource should not be cached by the client, and if no client ID is set and the client supports it, that a client ID is to be set to a value generated by the script.

In addition, the CGI script may monitor the number of times the Web page has been accessed in general. On the other hand, another CGI script located on the same or another server may be used for this purpose. This process may be carried out by simply incrementing a counter each time the resource is accessed, or may be conducted at any other time by merely counting the number of entries made in a stored record of requests made for the resource.

The other resource located on Server B is a JAVA applet, the tracking program. This resource can also be located on any other server, and is embedded in the Web page using the known HTML<APPLET> tag, which allows one to specify the source URL (through the CODE and CODEBASE parameters) as well as additional size, layout and initialization parameters. The client, in attempting to render the Web page, will automatically fetch the applet by making a request to Server B using the TCP/IP and HTTP protocols (S406). Soon after it has received the JAVA code for the tracking program, it will first execute the INIT (initialization) method of the applet (S407) and then the START method. The START method will make note of the current time using standard JAVA methods (S408). The STOP method of the applet which is executed, for example, when the user leaves the Web page (S409), will compute the difference between the current time and the time noted during execution of the START method. This difference, which is the time between execution of the STOP and execution of the START methods, is sent to the Server B for storage and analysis (S410). The information can be sent using standard JAVA network methods, such as opening a URL connection to a second CGI script on Server B (or any other server) designed to capture the tracked information (S410A). This second CGI script can then obtain any information tracked and transmitted by the applet as well as any available information in the HTTP request header. This information can be stored in a database on Server B or elsewhere. If necessary, the information stored by both scripts may be combined into one or more complete databases. As will be understood by those of ordinary skill in the art, acquisition of information by the server need not be conducted using CGI scripts. For instance, this information may be acquired by any other server-resident process designed for this purpose, or may be uploaded by the tracking program or other client-resident process, such as by a direct connection to a resource located on a server (i.e., a database), or by using any other known process.

The database thus constructed can be indexed by resource identity and may contain information about users who have visited the Web page, such as their network and client IDs, how often they visited the Web page, how long the Web page was displayed, and so on. Additionally, if the above-mentioned tracking mechanism is implemented across various Web pages in a particular Web site, the database thus constructed may contain similar information about the different Web pages in the Web site. Similarly, the information acquired by the tracking program may be combined with a process for monitoring the number of times the Web resource has been accessed. An analysis of the data on a user-indexed basis would facilitate the determination of individual user interests and the like. On the other hand, analysis of the data on a resource-indexed basis would allow the determination of, for example, which Web pages are viewed the longest and/or most often either by users in general, or by specific users. Thus, it would be possible to determine if there were different types of users that preferred different sections of the Web site (because, for example, they spent more time browsing different sections of the Web site). Additionally, if the above-mentioned tracking program is attached to an ad banner that is embedded in multiple Web pages across different Web sites (as is typically the case with ad banners), the database thus constructed may contain information about how often and for how long the different pages that contained the ad banner were displayed, as well as more specific information about users that visited those pages. With this information, advertisers could determine the accuracy of data supplied to them by Web site administrators about the number of times their ad banner was displayed, as well as learn how long the Web page containing the ad banner was displayed—a number that would be of great use in determining the effectiveness of their advertising.

Figure 5:
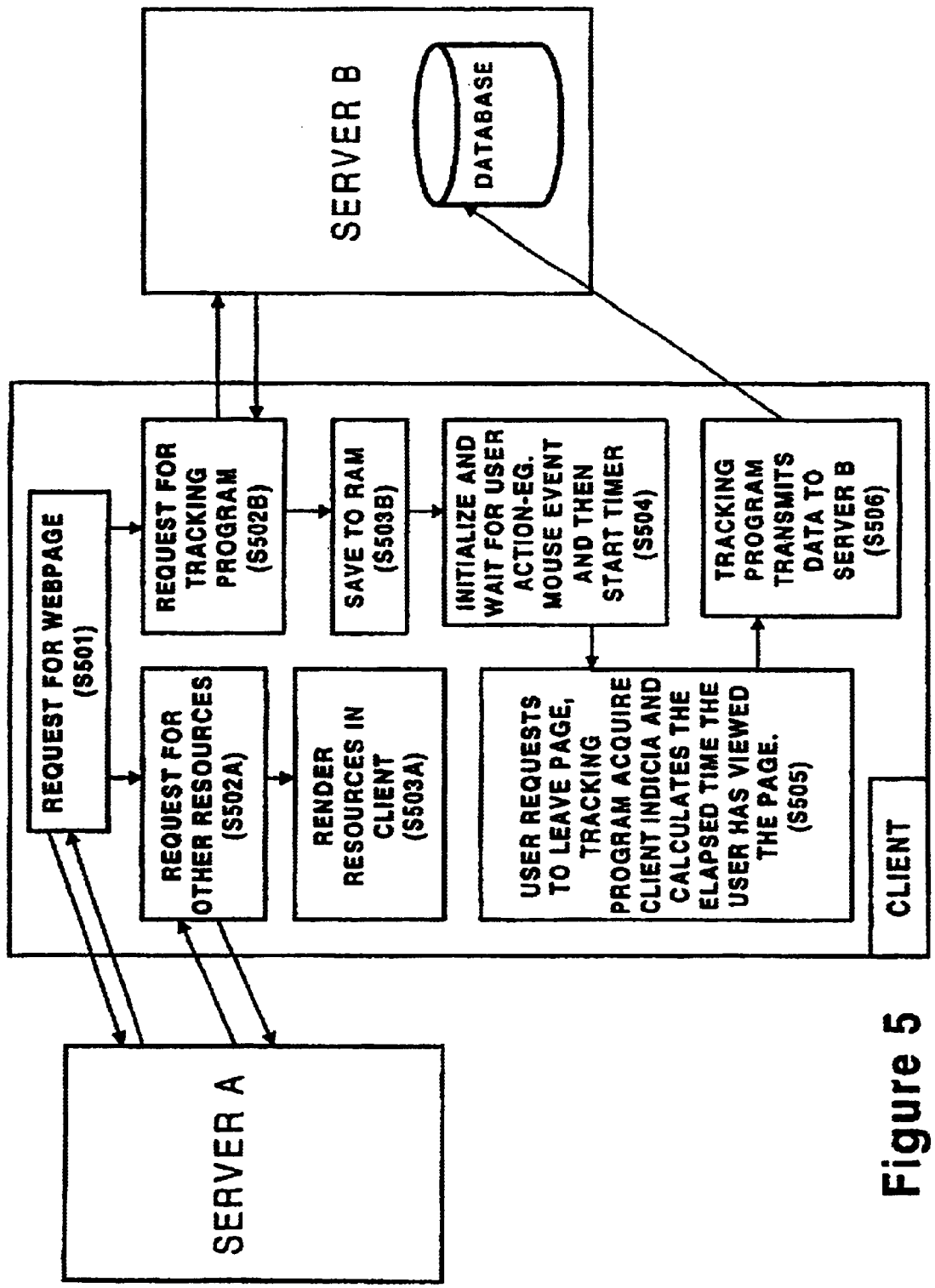
FIG. 5 is a flowchart diagram of a third embodiment of the present invention.

In another embodiment, the software timer of the tracking program may be initiated or stopped when the user incurs a keyboard or mouse event, such as by "clicking" on a specified area of an ad banner. This is illustrated in the flowchart shown in FIG. 5. Operation of the system in this embodiment is similar to that shown in FIG. 3. Thus, the client first issues a TCP/IP request (S501). After a handshaking period, a first Server A begins to send an HTML formatted document, which contains an embedded URL referencing the tracking program. The client additionally issues a TCP/IP request to a second Server B referenced by the embedded URL in order to obtain the tracking program (S502B). The client also makes any other TCP/IP requests to obtain any other resources (such as images, video or sound) needed in order to fully render the Web Page (S502A). Each of such resources are typically referenced by individual URLs embedded in the HTML document. These requests need not occur in any specific order, and the information requested may be received in any order. When the tracking program has been obtained, the client process (i.e., the Web browser) saves the tracking program to RAM (S503B). In this case, the tracking program commences a software timer upon the detection of a predetermined user action (S504). When the user performs another predetermined action (S505), the tracking program calculates the amount of time between the predetermined user actions, and sends this information, along with other available client information, to the server (S506).

Thus, for instance, the software timer of the tracking program may be used in monitor the amount of time a user spends interacting with a portion of a Web page. For example, if the Web page is provided with an interactive resource such as a game or an information resource activated by clicking on a particular button, the tracking program may determine how long a user has interacted with such a selection. In the case of a Web page provided with an ad banner, the tracking program can be designed to monitor the amount of time a user has interacted with the ad banner.

The tracking program may be used not only to monitor the time spent by a user in a Web page or an ad banner, but may also be used to create a more complex "historical" user profile to permit the server to assemble a Web page or target an ad banner based upon the diverse interests of respective users.

For example, when a user is exposed to an ad banner having information targeted to their particular interests, the user is more likely to interact with that ad banner for a longer period of time and on a more frequent basis, thereby increasing the value of that ad banner. In accordance with the present invention, in order to learn the particular interests of respective users, an ad banner may include specific information permitting the user to interact in different ways with the banner. The ad banner may have pull-down menu options, clickable buttons or "hot-spots", keyboard input, or any number of input mechanisms, whose selection or action upon in a designated manner causes corresponding events to take place in the ad banner such as the generation or synthesis of sounds, the display of images, video, or graphic animations, or the presentation of different types of information to the user, perhaps with additional choices. Such information may, for example, include links to interactive games, links to entertainment information, sports-related games and/or trivia, and the like, or information concerning particular goods and services, or means by which to order or purchase specific goods and services. The more choices that are made available, the more information that can be acquired concerning the user's particular interests. Of course, an unlimited number of possibilities are available, depending upon the application, and an exhaustive listing of such possibilities cannot be provided herein.

In this case, the tracking program is downloaded, as described above, with the HTML document in response to a TCP/IP client request. As above, the tracking program may monitor the amount of time the user spends displaying both the Web page and the ad banner embedded in the Web page as a whole, but also monitors the user's interaction with the Web page and the ad banner, such as by monitoring each of the choices made by the user within the Web page and ad banner. Thus, for example, if an interactive sports-related game is included in the Web page, the tracking program will determine if a user has played the game, what his or her score was, how long they played the game, and any other possible information. If a choice of different games, each directed to a different interest, are made available to users within the same ad banner, it is possible to determine what is of most interest to the user by the selection of the game. In addition, the ad banner may be provided with multiple links to other, diverse Web sites, such as Web sites relating to sports, entertainment, general information, technology, history, and the like. The tracking program monitors which of the various links are selected and provides this information to the server. As discussed above, other available client information may also be sent to the server. This information is sorted and stored in the server database and may be analyzed manually or automatically.

The tracked information may be used to assemble resources geared toward the user's interests. Based upon the historic user profiles created in the server database, downloading of information to the same client on a subsequent visit to the same or different Web page may be done on a more intelligent basis. For example, users who have previously expressed an interest in sports-related trivia (as indicated by their previously tracked behavior) may be served with information targeted to audiences interested in sports. Similarly, users who have expressed greater interest in technology may be served with technology-related information that would be of much less interest to other users. The assembly of a resource such as a Web page may be easily accomplished. For example, the HTML document of the Web page may include a plurality of embedded resources. Previous choices made by a user on a particular client computer and stored in a user profile database may be used to determine which of the resources is to be downloaded to that client using simple logical processing instructions. For instance, a user profile which indicates that a user has a greater interest in sports-related information than in historical information may be used to download sports-related resources, such as GIF-type images and advertisements. Since the user has previously expressed a greater interest in sports, sports-related advertisements may therefore be targeted to that user.

Figure 6:
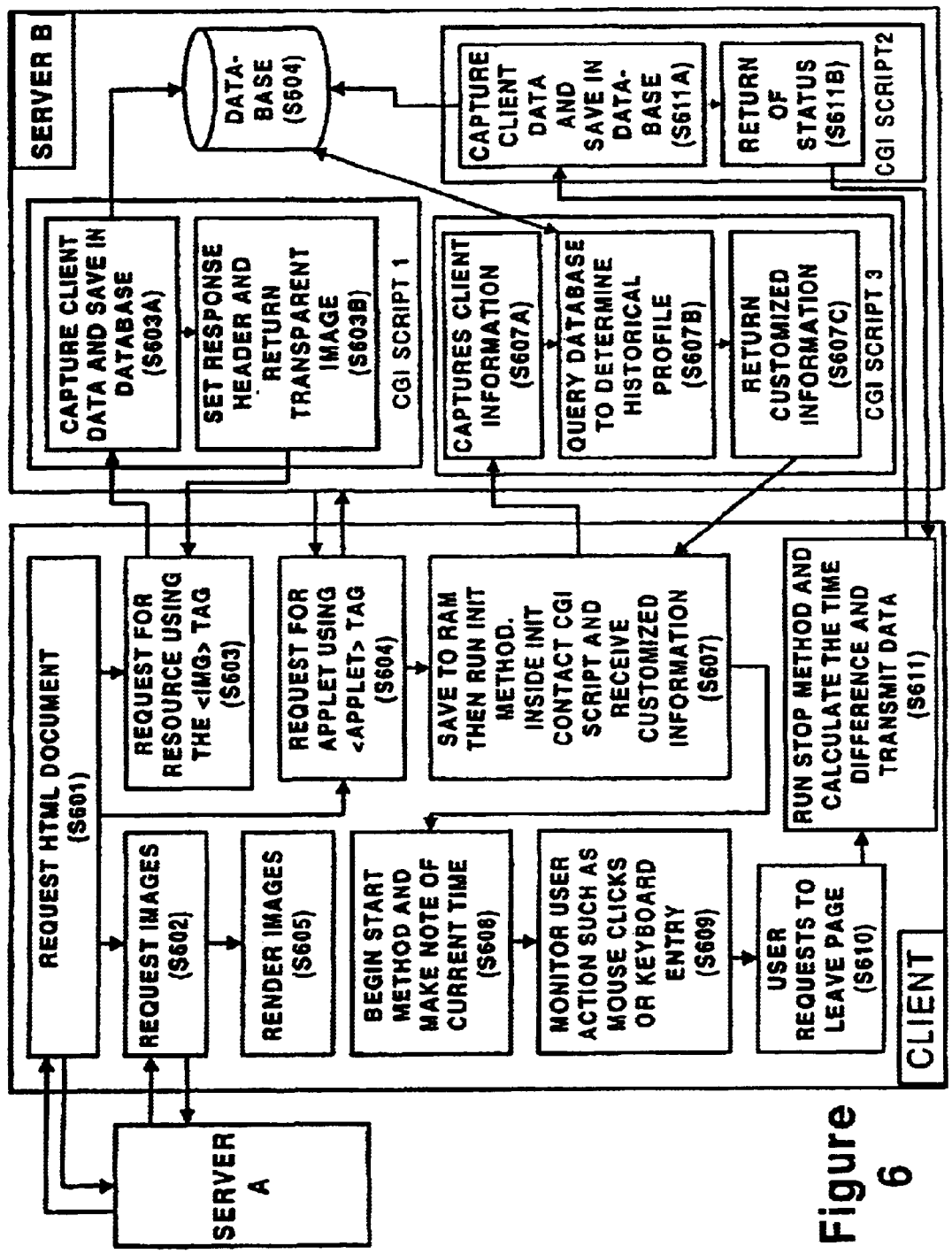
FIG. 6 is a flowchart diagram of a fourth embodiment of the present invention.

A particular implementation of this mechanism is illustrated in FIG. 6. A Web page is requested by the client from Server A (S601). This Web page contains text, as well as embedded images which must be fetched from Server A (S602) and rendered (S605). In addition, the Web page contains embedded URLs that point to two resources on Server B. The first resource is a first CGI script 1, which is embedded inside the Web page using the standard HTML<IMG> tag (S603). In attempting to render the Web page, the client will automatically fetch the resource associated with the <IMG> tag on Server B, which will result in execution of the CGI script 1. This CGI script 1 can capture client information such as Network ID or Client ID (S603A). The CGI script also returns a transparent image (S603B).

The other resource on Server B is a Java applet, which is a combination ad banner and tracking program. This may be stored on any server. In attempting to render the Web page, the client will automatically fetch the Java code (S604), download, initialize, and start operation of the applet (S607, S608). After the applet is initialized, it contacts Server B to obtain other resources it needs in order to display images, play sounds, or control its overall look and behavior. In fact, the applet may obtain these resources by executing one or more CGI scripts or other processes that reside on Server B or elsewhere (S607). Based on information provided to these scripts through standard HTTP methods, including client information (S607A), such as network and client IDs, any other information such as the URL of the Web page, as well as information captured by the CGI script 1, and the previously constructed historical database profile (S607B), different information (images, sounds, text, etc.) may be returned to the applet. Such information can therefore be selected by the scripts based on Network and/or Client ID, the URL of the Web page, and the previously constructed client profile. This may be accomplished in the manner described above.

The STOP method of the applet which is executed, for example, when the user leaves the Web page (S609), will compute the difference between the current time and the time noted during execution of the START method. This difference, which is the time between execution of the STOP and execution of the START methods, is sent to the Server B for storage and analysis (S610). The information can be sent using standard JAVA network methods, such as opening a URL connection to a second CGI script on Server B designed to capture the tracked information (S610A, S610B). In step S610A, the second CGI script may obtain any information acquired by the tracking program (i.e., the JAVA applet), as well as client identifying indicia transmitted by the client, such as in the HTTP request header. This information can be stored in a database on Server B. If necessary, the information stored by both scripts may be combined into one more completed databases.

In this embodiment of the present invention, two distinct databases may be created. The first database is indexable by resource identity (such as URL), and includes information such as URL of the Web document, number of times accessed, identity of clients that accessed the Web document, amount of time displayed, amount of data displayed, average time displayed, number of times accessed, and the like. In the case of an ad banner or other embedded resource which may be accessed by a link made by a user while browsing another resource, the database may include additional information such as "click-through rate" (the number of times the ad banner was clicked on to go to the Web site of the advertiser), and the like.

A second database that may be created is indexable by individual client, and includes information concerning individual client's interests and preferences. These separate databases may be combined in a single database indexable by client or resource identity.

Figure 7:
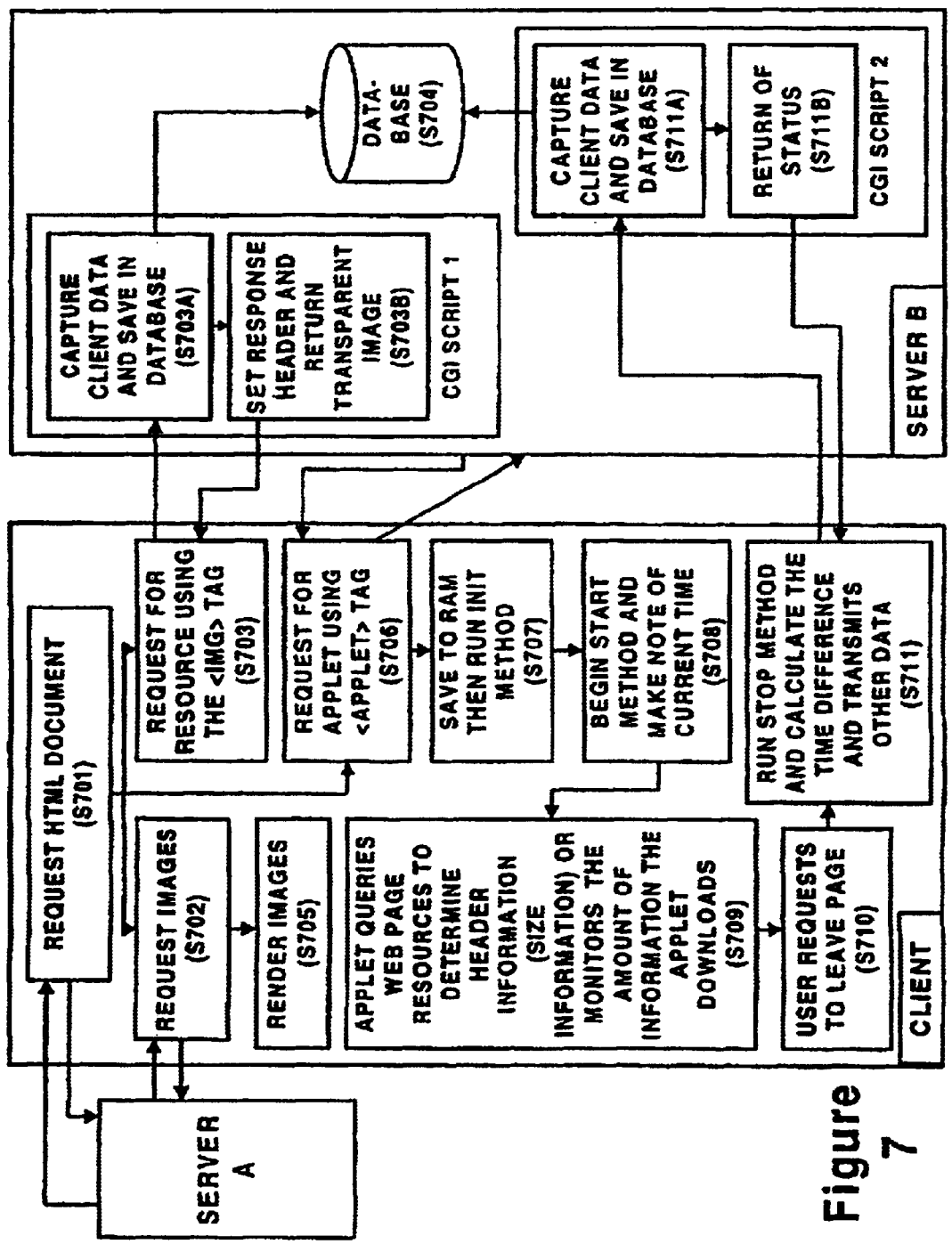
FIG. 7 is a flowchart diagram of a fifth embodiment of the present invention.

In another embodiment, illustrated in FIG. 7, the tracking program is used to create a database of information about a Web site (or, if desired, across multiple Web sites on multiple servers). In this case, the same tracking program is embedded in multiple Web pages served up by the same Server A. The tracking program in general originates from a Server B (but may also originate from Server A). The tracking program will monitor the time the Web page was displayed, and may capture any other information available to it. For example, the tracking program can determine the URL of the Web page it is embedded in and may determine the amount of information downloaded by the client.

In particular, a Web page is requested by the client from Server A (S701). This Web page contains text, as well as embedded images which must be fetched from Server A (S702) and rendered (S705). In addition, the Web page contains embedded URLs that point to two resources on Server B. The first resource is a CGI script, which is embedded inside the Web page using the standard HTML<IMG> tag (S703). In attempting to render the Web page, the client will automatically fetch the resource on Server B, which will result in execution of a CGI script 1. This CGI script 1 can capture client information such as Network ID or Client ID (S703A) and returns a transparent image (S703B). The other resource on Server B is a Java applet. This may be stored on any server. In attempting to render the Web page, the client will automatically fetch the JAVA code, store it in RAM, initialize, and start operation of the applet (S707). The START method of the applet is executed and the applet takes note of the current time (S708). Thereafter, the applet contacts the Server A and, if security restrictions allow it, the applet queries the Server A for the page it is embedded in, determines its size, as well as the URLs of other embedded resources (such as images or video), and requests header information about these resources in order to determine their size (S709). In this case, the tracking program may determine the size of the fully rendered Web page, (i.e., the number of bits that must be downloaded in order to fully render the Web page). If the tracking program is part of a larger embedded application that displays information downloaded from a server (such as a live news feed applet), the tracking program can also monitor the amount of information downloaded and displayed by the applet. Before or as the user leaves the Web page (S710), the tracking program can transmit this information to Server B for storage and analysis (S711, S711A, S711B). In this manner, it is possible to build a database of accurate information concerning how often different pages of a Web site are requested, how long they are displayed, and how much information was downloaded. This information would be of use to Web site administrators in order to judge the popularity of different Web pages, as well as for example to set advertising rates for any embedded advertisements.

Figure 8:
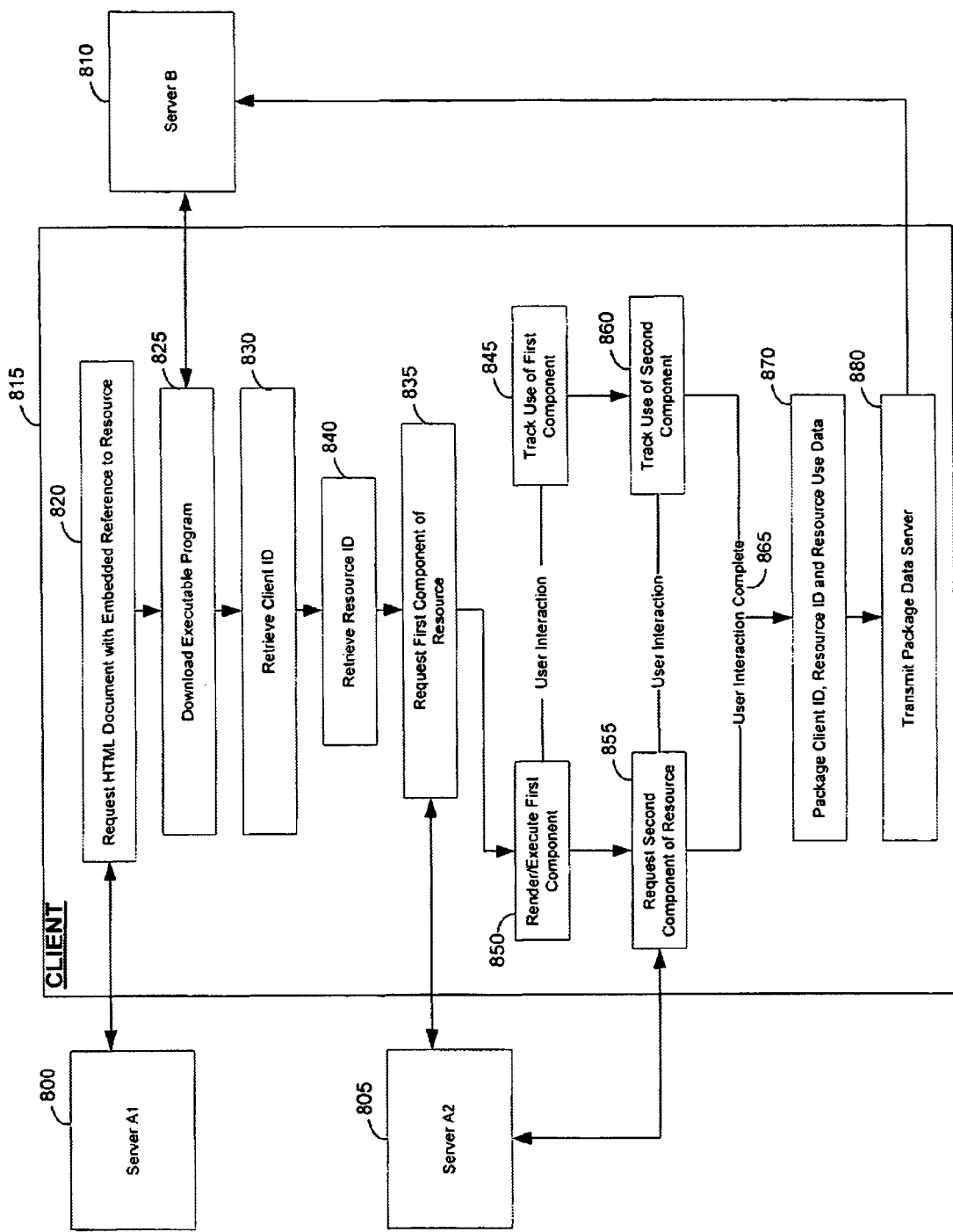
FIG. 8 is a flowchart diagram of a sixth embodiment of the present invention.

In another embodiment, illustrated in FIG. 8, a client 815 requests an HTML document 820 from Server A1 800. The HTML document 820 has an embedded reference to a resource. The resource comprises two components, each of which are stored on Server A2 805. Once the client has requested the HTML document 820 from Server A1 800, the client downloads an executable program 825 from Server B 810. While this embodiment illustrates the case where the executable program is stored on Server B 810, it will be understood by those skilled in the art that the executable program may also reside on Server A1 800, Server A2 805, or any other server coupled to the client 815. Alternatively, the executable program may reside on the client 815 and thus need not be downloaded before being run on the client 815. In a preferred embodiment, the executable program is an applet.

Once the executable program has been downloaded 825, the client program retrieves the client ID 830. Next, the client retrieves the resource ID 835. The client then requests the first component of the resource 840, which is stored on Server A2 805. The client 815 then renders and/or executes the first component 850 of the resource, allowing for user interaction with the first component. The executable program tracks the user's interaction with the first component 845. The client 815 requests the second component of the resource 855 and the executable program tracks the user's interaction with the second component of the resource 860.

Once the user interaction is complete 865, the executable program packages the client ID, the resource ID, and the resource use data 870. This packaged data is then sent 880 to Server B 810 for storage and analysis.

While this embodiment illustrates an example wherein both the first and second components of the resource are located on the same server, A2 805, those skilled in the art will recognize that the individual components of a resource need not be stored on the same server.

Figure 9:
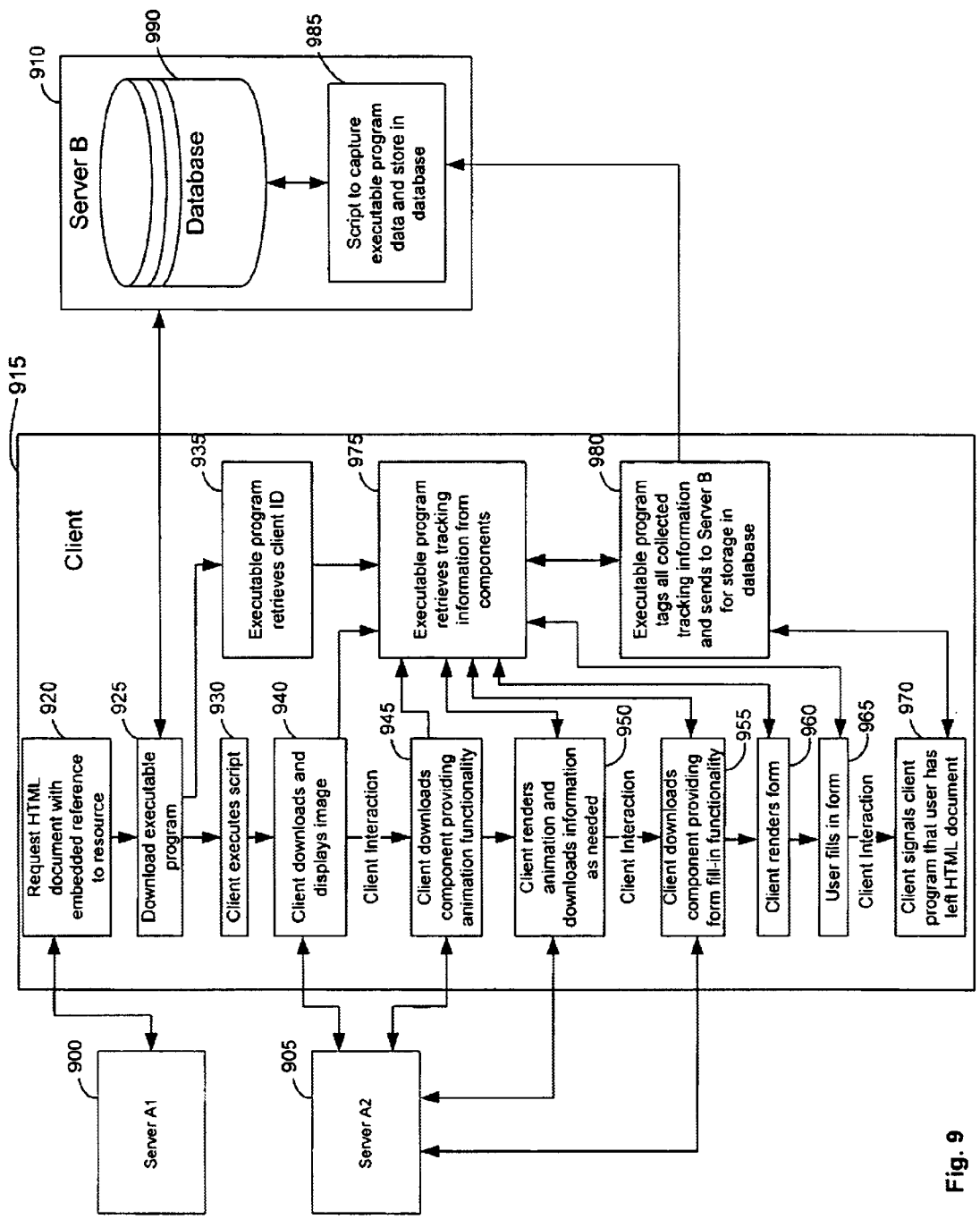
FIG. 9 is a flowchart diagram of a seventh embodiment of the present invention.

In another embodiment, illustrated in FIG. 9, a client 915 requests an HTML document 920 from a Server A1 900. The HTML document has an embedded reference to a resource comprising three components: a component for displaying images, a component for rendering animations, and a component for providing form fill-in functionality.

After the client 915 has requested from Server A1 900 the HTML document with an embedded reference to a resource, the client 915 downloads from Server B 910 an executable program 925. The client 915 then executes a script 930 embedded in the HTML document requested from Server A1 900. Meanwhile, the executable program retrieves the client ID 935 for the client 915 upon which the executable program is running.

In the example illustrated in FIG. 9, the script associated with the downloaded HTML document indicates that the first component of the referenced resource is one which displays images on the client 940. Since this component is stored on Server A2 905, the client 915 downloads the functionality and data required to execute the first component of the resource 940.

For purposes of this example, it is assumed that the first component of the embedded resource allows for user interaction. As the user interacts with the first component, the component keeps track of the user's interaction. At some point, the user interaction may determine that it is appropriate to start the second component of the embedded resource. Since the second component is stored on Server A2 905, the client 915 next downloads the second component of the resource 945. In this example, the second component of the embedded resource provides animation functionality to the client. The second component, thus downloaded and functioning 950 on the client 915, tracks user interaction with the second component.

When the user interaction with the second component so indicates, via the logic of the script associated with the HTML document 930, the client will download the next component of the resource; in this example, the third component of the resource is the functionality to fill in forms. Thus, the client 915 downloads from Server A2 905 the resource's component which provides form fill-in functionality 955. Once this third component is downloaded, the client 915 renders the form 960 and allows user interaction for filling in the form 965. The form fill-in component tracks this user interaction with the component.

As each component collects user tracking information, the information is retrieved by the executable program 975.

At some point, the user's interaction will indicate that the user has left the HTML document which contained the resource for which the three components were required 970. The executable program, having recognized that the user has left the HTML document embedded with the resource, tags all of the retrieved tracking information from the components with client ID and resource ID information 980. The appropriately tagged tracking information is then sent by the client program 980 to Server B 910. On Server B 910, there is running a script 985 which captures the executable program data sent from the client 915 and stores it in database 990 for storage and possible later analysis.

While the example illustrated in FIG. 9 has been described as one in which the individual components of the resource do the tracking of the client interaction such that the client interaction tracking data generated by each of the components is in the proper format, except for being tagged with appropriate ID tags, for storage in the database 990 stored on Sever B 910, those skilled in the art will recognize that the components may be designed such that some or all of them do not generate data about each user interaction which is usable in the database 990, but rather pass the interaction data to the executable program 975. The executable program then must generate data pertaining to the user interactions in a format suitable for storage in the database 990.

Figure 10:
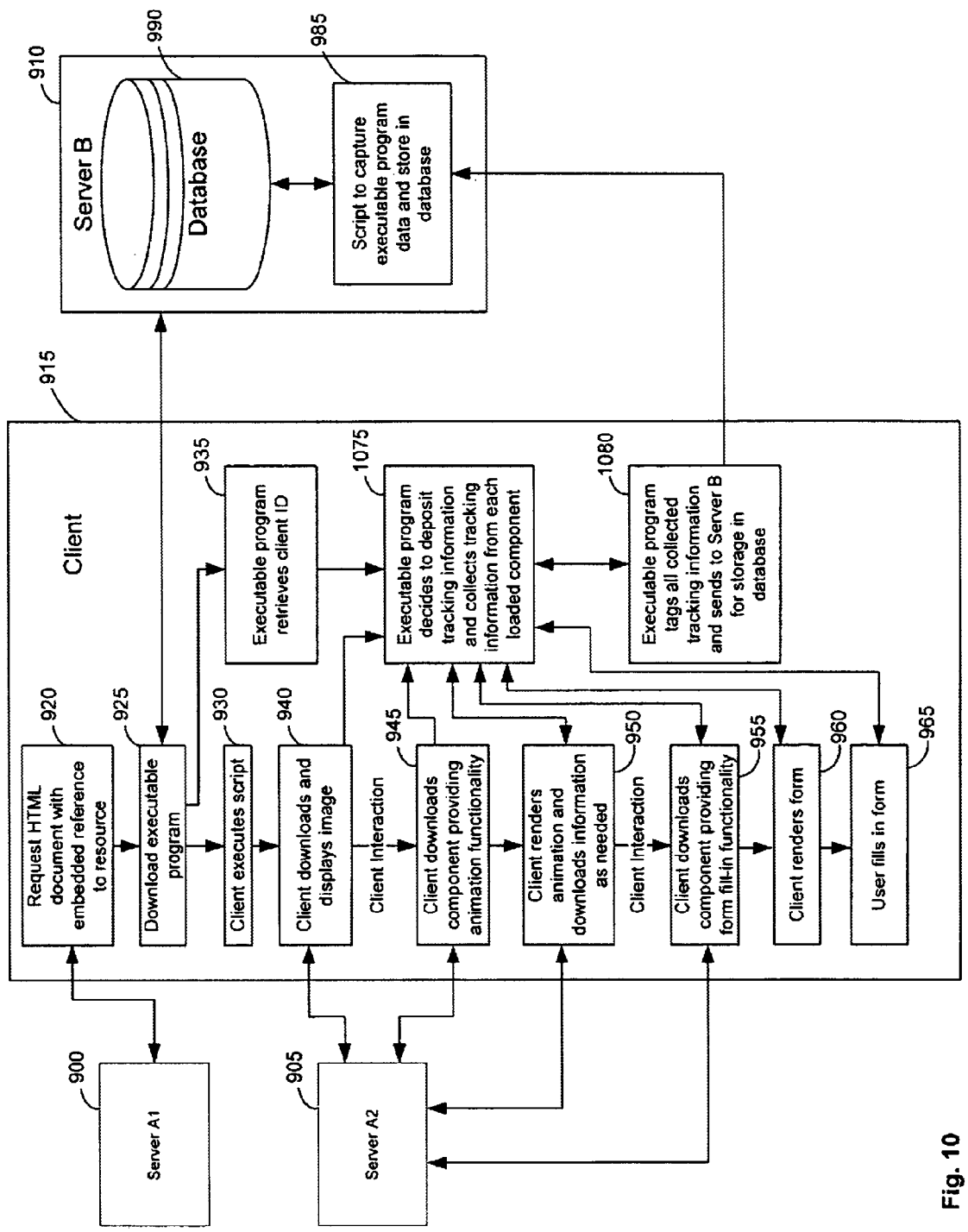
FIG. 10 is a flowchart diagram of a eighth embodiment of the present invention.

The example illustrated in FIG. 10 is closely associated with the one illustrated in FIG. 9; the point of difference between the two is that in the example illustrated in FIG. 10, the executable program may decide at a given time, by way of example: based on time, user interaction, request of Server B 910, or instructions contained in the HTML document, to collect tracking information from each of the loaded components 1075. When the executable program decides to collect the interaction information, it will then tag all of the collected tracking information with ID data 1080 and send the tagged information to Server B 910 for storage in the database 990. That is, in the example illustrated in FIG. 10, the executable program does not necessarily wait for the user to leave the HTML document with the embedded resource before collecting the interaction information, tagging it with ID information, and sending it to Server B 910; the executable program may collect the interaction information 1075, tag it with ID information 1080, and send it to Server B 990 based on an event other than the user leaving the HTML document with the embedded resource.

As with the example illustrated in FIG. 9, the script associated with the downloaded HTML document 930 indicates that the first component of the referenced resource is one which displays images on the client 940. Since this component is stored on Server A2 905, the client 915 downloads the functionality and data required to execute the first component of the resource 940.

As with the example illustrated in FIG. 9, it is assumed that the first component of the embedded resource allows for user interaction. As the user interacts with the first component, the component keeps track of the user's interaction. At some point, the user interaction may determine that it is appropriate to start the second component of the embedded resource. Since the second component is stored on Server A2 905, the client 915 next downloads the second component of the resource 945. As in the example illustrated in FIG. 9, the second component of the embedded resource provides animation functionality to the client. The second component, thus downloaded and functioning 950 on the client 915, tracks user interaction with the second component.

When the user interaction with the second component so indicates, via the logic of the script associated with the HTML document 930, the client will download the next component of the resource; in this example the third component of the resource is the functionality to fill in forms. Thus, the client 915 downloads from Server A2 905 the resource's component which provides form fill-in functionality 955. Once this third component is downloaded, the client 915 renders the form 960 and allows user interaction for filling in the form. The form fill-in component tracks user interaction with the component.

At some point, based on, for example and not by way of limitation, the time, a request from Server B 910, a particular user interaction, or instructions contained in the HTML document in which the resource is embedded, the executable program collects tracking information from each of the loaded components 1075. The executable program then tags the collected tracking information with client ID and resource ID information and sends the appropriately tagged tracking information 1080 to Server B 910. On Server B 910, there is running a script which captures the executable program data sent from the client 915 and stores it in database 990 for storage and possible later analysis.

Figure 11:
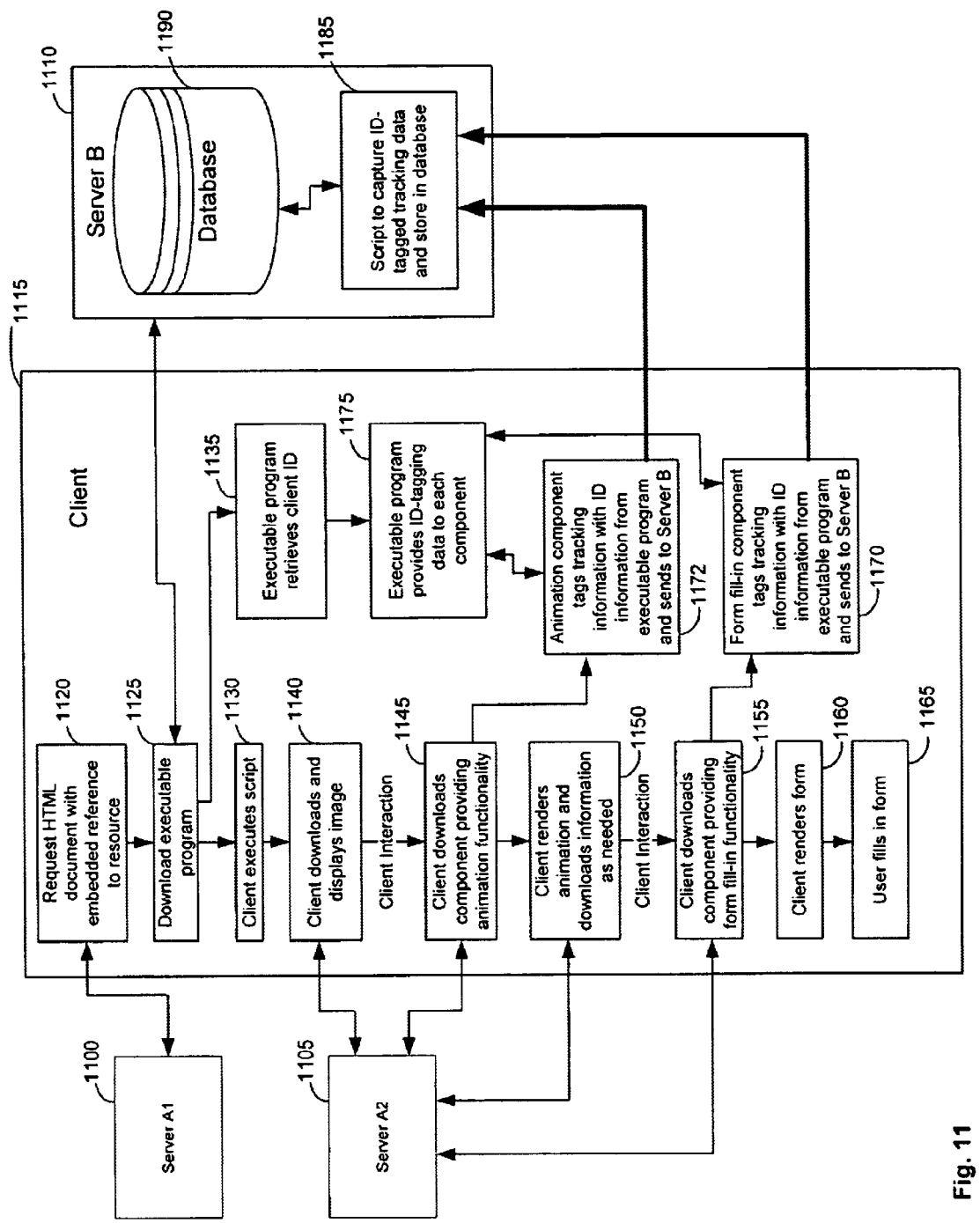
FIG. 11 is a flowchart diagram of a ninth embodiment of the present invention.

In another embodiment, illustrated in FIG. 11, a client 1115 requests an HTML document 1120 from a Server A1 1100. The HTML document has an embedded reference to a resource comprising three components: a component for displaying images, a component for rendering animations, and a component for providing form fill-in functionality. In this example, we are interested in collecting interaction data about only two of the three components which comprise the resource: the component providing animation functionality and the component providing form fill-in functionality.

After the client 1115 has requested from Server A1 1100 the HTML document with an embedded reference to a resource, the client 1115 downloads from Server B 1110 an executable program 1125. The client 1115 then executes a script 1130 embedded in the HTML document requested from Server A1 1100. Meanwhile, the executable program retrieves the client ID 1135 for the client 1115 upon which the executable program is running.

In the example illustrated in FIG. 11, the script associated with the downloaded HTML document indicates that the first component of the referenced resource is one which displays images on the client 1140. Since this component is stored on Server A2 1105, the client 1115 downloads the functionality and data required to execute the first component of the resource 1140.

For purposes of this example, it is assumed that the first component of the embedded resource allows for user interaction; however, since in this embodiment we are not interested in tracking user interaction with the first component, the first component does not track user interactions. At some point, the user interaction may determine that it is appropriate to start the second component of the embedded resource. Since the second component is stored on Server A2 1105, the client 1115 next downloads the second component of the resource 1145. In this example, the second component of the embedded resource provides animation functionality to the client. The second component, thus downloaded and functioning 1150 on the client 1115, tracks user interaction with the second component. As the second component tracks user interactions, it may decide to send user interaction information to Server B 1110. If so, the second component will retrieve ID-tagging data from the executable program and appropriately tag the user interaction information with the ID-tagging data 1172. The second component will then send the tagged user interaction information to Server B 1110 for storage in database 1190 and possible later analysis.

When the user interaction with the second component so indicates, via the logic of the script associated with the HTML document, the client will download the next component of the resource; in this example the third component of the resource is the functionality to fill in forms. Thus, the client 1115 downloads from Server A2 1105 the resource's component which provides form fill-in functionality 1155. Once this third component is downloaded, the client 1115 renders the form 1160 and allows user interaction for filling in the form. The form fill-in component tracks this user interaction with the component.

As with the second component, the third component tracks user interactions and may decide to send user interaction information to Server B 1110. If so, the third component will retrieve ID-tagging data from the executable program and appropriately tag the user interaction information with the ID-tagging data 1170. The third component will then send the tagged user interaction information to Server B 1110 for storage in database 1190 and possible later analysis.

In yet another embodiment, the tracking program is used to assemble a bill for the user's access to information. For example, users who have access to a live news or entertainment feed may be charged according to the amount of information displayed, either according to bit size or time, or both. Imagine that the tracking program is attached to a live feed applet. The tracking program monitors the time the information is displayed and the amount of bits downloaded and automatically transmits this information back to a server when the user leaves. Together with the user's ID (client and network), and billing information that the user was previously requested to enter, it is possible to determine the correct charge for the user. Similarly, a user could be charged and billed for time spent on a Web page, as well as amount of information downloaded by him or her.

The methods embodied in the invention may be used to create web resources with so-called "persistent" state. That is, the tracking program, in addition to the client profile database, may also be used to create a Web resource that appears to automatically "remember" the user's previous interactions on the Web resource. This may be implemented as in FIG. 6. For example, consider a Web page with an embedded Crossword program which also incorporates tracking mechanisms. When the page is rendered and the Crossword program commences, a user is able to use the keyboard and mouse to fill in letters on the Web page based on clues that are displayed. At the same time, these choices are tracked, along with any other information including but not limited to time. Before or at the time the user leaves the Web page, the tracked information is sent to a server for storage (S610). When the user later returns to that page, the network or client ID is used to automatically fill in the letters in the crossword that were previously selected (As in S607–607C).

Although the invention has been described in terms of preferred embodiments, those skilled in the art will recognize that various modifications of the invention can be practiced within the spirit and scope of the appended claims. Thus, for example, the scripts used to transfer data need not be CGI scripts but could be a dedicated server or a direct connection to the database, such as using JDBC (Java Database Connectivity) to place data into the database.

In addition, while the preferred embodiments have been described in connection with JAVA applets that are executable on a client, the tracking of user interaction may be accomplished by a client executable program written in a language other than JAVA. For example, the teachings of the present invention may be accomplished using Active-X components in conjunction with the Internet Explorer Web browser. In addition, the tracking program need not be a program that executes on the client computer. For example, the tracking program may comprise a CGI script located on a server. Upon execution of the CGI script, the time at which a Web page is downloaded may be determined. By modifying Web browser software using appropriate instructions, the browser can be used to send a signal to the server that downloaded the Web page upon the occurrence of a predetermined user operation (such as exiting the Web page or clicking on a link to another Web page or resource). In this manner, a program running on the server can be used to determine the total time period the user has interacted with and displayed the Web page.

It should also be appreciated that while the preferred embodiments of the tracking program use a single database to store the information, multiple databases could be used to store and process the information.

In addition, while in the preferred embodiments of the tracking program the server that originated the tracking program and the database reside on the same machine, this is not a requirement of the present invention. The database may instead reside on a separate machine from that which serves the tracking program. Similarly, while in the preferred embodiments the server that originates the network resource, or Web page (Server A), and the server that originates the tracking program (Server B) are different servers, this is not a requirement of the present invention. The network resource (Web page) and the tracking program may be served out by the same server.

It should also be appreciated that while in the preferred embodiments the tracking program uses the HTTP and TCP/IP protocols, other network data transmission protocols could be used that implement the same functionality. Moreover, use of an HTML formatted Web page is not necessary. The information supplied to the user may not be in the form of an HTML or Web document such as a Web page, but can be some other form of information. In addition, the tracking program need not be downloaded to the client from the server, but can be an added module to the client application or Web browser running on the client, or may be stored elsewhere on the client machine. For example, in the former case, added modules could be plug-ins and in the latter case could be referred to as cached resources. In such cases, the client application or Web browser would include appropriate means to enable activation of the tracking program and the uploading of a client profile based upon the user's interaction with a Web page or network resource.

Moreover, although in the preferred embodiments it is envisioned that the network resource or Web page is downloaded from a remote server, this is not a limitation of the invention. The precise location of the target document or server is not important. For example, the target document may even be located on the hard drive of the client machine.

Also, while in the above-described embodiments, the client profile is created automatically using information acquired by the tracking program and one or more CGI scripts and is stored in the server database, the client profile can be created in a different manner and/or supplemented by additional information. For example, one such technique for creating a client profile is through the use of HTML "fill-in" form tags. In such cases, the client profile is created not by the tracking program, but instead by the client. Based on the client profile, the server can serve out information targeted to the client's interest, as revealed by the fill-in form.

Also, while the preferred embodiments have been described in the context of Web browser software, the techniques of the invention apply equally whether the user accesses a local area network, a wide area network, a public network, a private network, the Internet, the World Wide Web, or the like, and whether access to the network is achieved using a direct connection or an indirect connection. For example, in connection with the World Wide Web, the teachings of the present invention apply whether a network connection is obtained via a direct Internet connection or indirectly through some on-line service provider. Thus, the "computer network" in which the invention is implemented should be broadly construed to include any computer network in which one or more clients is connectable to one or more servers, including those networks based upon the client-server model in which a client can link to a "remote" document (even if that document is available on the same machine, system, or "Intranet").

It should also be appreciated that while in the preferred embodiments the tracking program is downloaded with the Web page from the server, this is not a limitation of the invention. The tracking program need not be embedded within an existing Web page, but rather may be embedded within a Web browser or supported elsewhere within the client itself. Thus, the tracking program may be initiated whenever a call to a Web page or network resource is made, such as when a search to a particular URL is initiated, or when a previously-stored URL is launched.

We claim:

1. In a network having one or more servers connectable to one or more clients, a method of monitoring interaction through a first client of the one or more clients with a first resource, the first resource comprising a plurality of components and having a resource identifier associated therewith, the method comprising:

downloading to the first client a first component of the first resource from a first server;

executing on the first client an executable program to download one or more second components of the first resource;

monitoring interaction through the first client with the first component of the first resource and with the one or more second components of the first resource;

generating resource use data; and transmitting from the first client to a second server information comprising resource use data and the resource identifier.

2. The method of claim 1, wherein the monitoring is performed by one or more executable elements of the one or more second components.

3. The method of claim 2, wherein the one or more executable elements transfer resource use data to the executable program upon use of the one or more second components.

4. The method of claim 2, wherein the one or more executable elements store resource use data upon use of the one or more second components and transfer the stored resource use data to the executable program upon receipt of a request from the executable program.

5. The method of claim 2, comprising the executable program transferring the resource identifier to the one or more executable elements, and wherein the step of transmitting the resource use data and resource identifier is performed by the one or more executable elements.

6. The method of claim 1 wherein the resource use data comprises data generated in response to predetermined interactions with the first component of the first resource and predetermined interactions with the one or more second components of the first resource.

7. The method of claim 6 wherein the predetermined interactions with the first component comprise interactions with the first component other than interactions with the first component used by the first component or the one or more second components.

8. The method of claim 6 wherein the predetermined interactions with the one or more second components comprise interactions with the one or more second components other than interactions with the one or more second components used by the first component or by the one or more second components.

9. The method of claim 1, wherein the step of transmitting the resource use data and resource identifier is performed by the executable program.

10. The method of claim 9, wherein the monitoring is performed by one or more executable elements of the one or more second resources, and comprising the one or more executable elements transferring the resource use data to the executable program.

11. The method of claim 1 wherein the resource use data comprises data other than data used by the first component.

12. The method of claim 1 wherein the resource use data comprises data other than data used by the second or more components.

13. The method of claim 1 wherein the resource use data comprises data other then data used by the first resource.

14. The method of claim 1 wherein the first program is downloaded from the first server.

15. The method of claim 1 wherein the first program is downloaded to the first client as part of the first component of the first resource.

16. The method of claim 1 wherein the first component of the first resource comprises the first program.

17. The method of claim 1, comprising downloading the executable program from a third server.

18. The method of claim 1, comprising downloading the executable program from the second server.

19. The method of claim 1, wherein the executable program is a part of the first component of the first resource.

20. The method of claim 1, wherein the executable program is implemented in the Java programming language.

21. The method of claim 1, wherein the one or more second components are implemented in the Java programming language.

22. The method of claim 1, wherein the resource use data comprises data representative of a duration of time for which the first resource was used by the first client.

23. The method of claim 1, wherein the resource use data comprises data representative of a duration of time for which the first component, or a part or parts thereof, was used by the first client.

24. The method of claim 1, wherein the resource use data comprises data representative of a duration of time for which the one or more second components, or a part or parts thereof, were used by the first client.

25. The method of claim 1, wherein the resource use data comprises data indicative of whether the first user used the resource.

26. The method of claim 1 wherein the network comprises a computer network.

27. The method of claim 1 wherein the network comprises a communications network.

28. In a computer network comprising one or more servers and one or more clients, a method of monitoring interaction through a first client of the one or more clients with a first resource or at least one component thereof obtained by the first client from at least one first server of the one or more servers, the method comprising:

downloading the first resource in a series of one or more components from the at least one first server to the first client;

downloading a tracking program from a server of the one or more servers to the first client, wherein the downloading of the first resource or at least one of the components thereof causes the downloading of the tracking program;

executing the tracking program on the client computer to monitor interaction through the client computer with at least one of the first resource, at least one of the components thereof, and one or more second resources, the one or more second resources having been obtained by the first client from at least one server of the one or more servers as a result of interaction through the first client with at least one of the first resource, at least one of the components thereof, and a second resource of the one or more second resources;

storing resource use data associated with the monitored interaction; and communicating the resource use data to a server of the one or more servers.

29. The method of claim 28, wherein downloading the first resource comprises downloading a Web page.

30. The method of claim 29, wherein the tracking program is embedded in the Web page.

31. The method of claim 28, comprising storing the resource use data in a server of the one or more servers.

32. The method of claim 31, comprising storing the resource use data in a database.

33. The method of claim 28, wherein monitoring user interaction comprises monitoring input device events.

34. The method of claim 33, wherein the input device events comprise at least one of keyboard events and mouse events.

35. The method of claim 28, comprising downloading the first resource as a result of a request initiated by input from a user of the first client.

36. The method of claim 28, comprising downloading the tracking program from a second server of the one or more servers.

37. The method of claim 28, comprising monitoring details of choices made by a user of the first client using an input device of the first client, the choices being associated with at least one of the first resource, at least one of the one or more components thereof, and the one or more second resources.

38. The method of claim 28, comprising storing the resource us data in the client computer.

39. The method of claim 28, comprising communicating the resource use data from the first client to a server of the one or more servers.

40. In a network having one or more servers connectable to one or more clients, a method of monitoring interaction through a client of the one or more clients with a first resource which is stored on a first server and which may be stored in a cache, the method comprising:

downloading from one or more source servers one or more files containing embedded references to the first resource and a second resource;

the client requesting or using the first resource one or more times from the first server or from the cache;

downloading the second resource from a second server to the client, the first server and second server comprising two servers and the second resource not being part of the first resource; and using the second resource to monitor interaction through the client with the first resource.

41. The method of claim 40, wherein the second resource is an applet.

42. The method of claim 41, wherein the applet is implemented in the Java programming language.

43. The method of claim 40, wherein the step of requesting or using one or more files comprises requesting from one or more source servers a plurality of files each containing embedded references to the first resource and a second resource.

44. The method of claim 43, wherein the step of the client requesting or using the first resource comprises the client retrieving the first resource from cache for one or more files following a first file in the plurality of files.

45. The method of claim 43, wherein the step of requesting a plurality of files comprises requesting the files from a plurality of source servers.

46. The method of claim 40, wherein the step of requested the second resource comprises requesting the second resource each time the one or more files is requested.

47. The method of claim 46, wherein the step of using the second resource to monitor the number of times the first resource is requested or used comprises monitoring at the second server the number of times the second resource is requested to thereby monitor the number of times a file containing an embedded reference to the first resource is requested or used.

48. The method of claim 40, wherein the second resource is an executable program, comprising using the second resource to monitor a number of times the first resource is requested or used, wherein using the second resource comprises executing the second resource on the client to monitor each time the first resource is retrieved from the first server or from the cache.

49. The method of claim 40 wherein the network comprises a computer network.

50. The method of claim 40 wherein the network comprises a communications network.

51. In a network having one or more servers connectable to one or more clients, a method of monitoring interaction through a first client of the one or more clients with a first resource by a user, the first resource comprising a plurality of components and having a resource identifier associated therewith, the method comprising:

downloading to the first client a first component of the first resource from a first server;

executing on the first client an executable program to download one or more second components of the first resource;

monitoring interaction through the first client with the first component of the first resource and interaction through the first client with the one or more second components of the first resource;

generating resource use data; and transmitting from the first client to a second server information comprising resource use data and the resource identifier.

52. The method of claim 51 wherein the resource use data comprises data representative of a plurality of preferences of the user.

53. The method of claim 51 wherein the resource use data comprises data representative of a plurality of interests of the user.

54. The method of claim 51 wherein the resource use data comprises data which does not affect the user's contemporaneous experience of the resource.

55. The method of claim 51 wherein the step of generating resource use data does not require the active participation of a user.

56. The method of claim 51 wherein the step of generating resource use data comprises the automatic determination of a user's preferences.

57. In a network having one or more servers connectable to one or more clients, a method of monitoring interaction through a first client of the one or more clients with a first resource comprising a plurality of components, the first resource having a resource identifier associated therewith, the method comprising:

downloading to the first client a first component of the first resource from a first server;

monitoring interaction through the first client with the first component of the first resource to generate resource use data; and transmitting from the first client to a second server the resource use data and the resource identifier.

58. The method of claim 57, comprising downloading the executable program from a third server.

59. In a network having one or more servers connectable to one or more clients, a method of monitoring interaction through a first client of the one or more clients with a first resource comprising a plurality of components, the first resource having a resource identifier associated therewith, the method comprising:

downloading to the first client a first component of the first resource from a first server;

executing on the first client an executable program to download one or more second components of the first resource;

monitoring interaction through the first client with the first component of the first resource to generate resource use data;

monitoring interaction through the first client with the one or more second components to generate resource use data;

executing on the first client one or more of the second components to download one or more third components of a second resource;

monitoring interaction through the first client with the one or more third components to generate resource use data; and transmitting from the first client to a second server the resource use data and the resource identifier.

* * * * *